(12) United States Patent
Lan et al.

(10) Patent No.: US 12,676,383 B2
(45) Date of Patent: Jul. 7, 2026

(54) SEPARATOR, PREPARATION METHOD THEREOF, AND SECONDARY BATTERY, BATTERY MODULE, BATTERY PACK, AND APPARATUS RELATED THERETO

(71) Applicant: CONTEMPORARY AMPEREX TECHNOLOGY (HONG KONG) LIMITED, Hong Kong (CN)

(72) Inventors: Yuanyuan Lan, Ningde City (CN); Cong Cheng, Ningde City (CN); Jianrui Yang, Ningde City (CN); Haiyi Hong, Ningde City (CN); Na Liu, Ningde City (CN); Haizu Jin, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/864,297

(22) Filed: Jul. 13, 2022

(65) Prior Publication Data

US 2022/0352599 A1      Nov. 3, 2022

Related U.S. Application Data

(63) Continuation of application No. PCT/CN2020/132952, filed on Nov. 30, 2020.

(51) Int. Cl.
H01M 50/449 (2021.01)
H01M 50/403 (2021.01)
H01M 50/446 (2021.01)

(52) U.S. Cl.
CPC ....... H01M 50/446 (2021.01); H01M 50/403 (2021.01)

(58) Field of Classification Search
CPC ............. H01M 50/446; H01M 50/403; H01M 50/491; H01M 50/494; H01M 50/451;
(Continued)

(56) References Cited

U.S. PATENT DOCUMENTS 11,814,483 B2 11/2023 Jeon et al.
2006/0019153 A1 1/2006 Imachi
(Continued)

FOREIGN PATENT DOCUMENTS

CN 102630353 A 8/2012
CN 103441230 A 12/2013
(Continued)

OTHER PUBLICATIONS

Machine translation of CN 209148798, retrieved from <www.espacenet.com> on Mar. 17, 2023.*
(Continued)

*Primary Examiner* — Cynthia K Walls
(74) *Attorney, Agent, or Firm* — K&L Gates LLP

(57)      ABSTRACT

This application relates to a separator, including: a substrate; and a coating layer provided on at least one surface of the substrate; where the coating layer includes inorganic particles and organic particles, the organic particles include first organic particles, the first organic particles are embedded into the inorganic particles and form bulges on a surface of the coating layer, and a number-based median particle size of the first organic particles is $\geq 12$ $\mu$m. This application further relates to a method for preparing the separator, a secondary battery containing the separator, a battery module including the secondary battery, a battery pack, and an apparatus.

22 Claims, 10 Drawing Sheets

(58) Field of Classification Search
CPC ............. H01M 50/209; H01M 50/414; H01M
50/431; H01M 50/443; H01M 2220/20;
H01M 2220/30; Y02E 60/10
See application file for complete search history.

(56) References Cited

U.S. PATENT DOCUMENTS

| | | | |
|---|---|---|---|
| 2006/0019154 A1 | 1/2006 | Imachi | |
| 2010/0196750 A1 | 8/2010 | Kajita | |
| 2011/0311870 A1 | 12/2011 | Wakizaka | |
| 2013/0017431 A1 | 1/2013 | Frisk et al. | |
| 2013/0244116 A1 | 9/2013 | Watanabe | |
| 2014/0255796 A1 | 9/2014 | Matsuoka | |
| 2015/0140402 A1 | 5/2015 | Kim | |
| 2015/0188108 A1 | 7/2015 | Miyazawa et al. | |
| 2015/0240039 A1 | 8/2015 | Katsuda | |
| 2015/0280197 A1 | 10/2015 | Zhao | |
| 2015/0295216 A1* | 10/2015 | Okuno ................ H01M 50/449 |
| | | | 320/128 |
| 2016/0141575 A1 | 5/2016 | Sasaki | |
| 2017/0149040 A1 | 5/2017 | Suzuki | |
| 2017/0288192 A1 | 10/2017 | Chen et al. | |
| 2019/0237734 A1* | 8/2019 | Lee ................... H01M 10/0565 |
| 2019/0280274 A1 | 9/2019 | Kim et al. | |
| 2021/0005858 A1 | 1/2021 | Kim et al. | |
| 2021/0184311 A1* | 6/2021 | Lefebvre ............. H01M 50/489 |
| 2021/0320379 A1 | 10/2021 | Kwon | |
| 2022/0285722 A1 | 9/2022 | Sung et al. | |

FOREIGN PATENT DOCUMENTS

| | | | |
|---|---|---|---|
| CN | 103904276 A | 7/2014 | |
| CN | 104064707 A | 9/2014 | |
| CN | 104659311 A | 5/2015 | |
| CN | 105958000 A | 9/2016 | |
| CN | 107895765 A | 4/2018 | |
| CN | 109037555 A | 12/2018 | |
| CN | 109148798 * | 1/2019 | ........ H01M 10/0525 |
| CN | 109950451 A | 6/2019 | |
| CN | 109980164 A | 7/2019 | |
| CN | 110233223 A | 9/2019 | |
| CN | 111192999 A | 5/2020 | |
| CN | 111244365 A | 6/2020 | |
| CN | 111492507 A | 8/2020 | |
| CN | 111554860 A | 8/2020 | |
| CN | 111653717 A | 9/2020 | |
| CN | 111668427 A | 9/2020 | |
| CN | 111682149 A | 9/2020 | |
| CN | 111954943 A | 11/2020 | |
| CN | 113363672 A | 9/2021 | |
| CN | 117397109 A | 1/2024 | |
| EP | 2485295 A1 | 8/2012 | |
| JP | 2010238448 A | 10/2010 | |
| JP | 2013008481 A | 1/2013 | |
| JP | 2018506820 A | 3/2018 | |
| JP | 2018050833 A | 4/2018 | |
| JP | 2018053043 A | 4/2018 | |
| JP | 2018147578 A | 9/2018 | |
| JP | 2019133934 A | 8/2019 | |
| JP | 2022552622 A | 12/2022 | |
| KR | 1020120091028 A | 8/2012 | |
| KR | 20130099592 A | 9/2013 | |
| KR | 20140037660 A | 3/2014 | |
| KR | 20140125352 A | 10/2014 | |
| KR | 1020150020667 A | 2/2015 | |
| KR | 20150040239 A | 4/2015 | |
| KR | 20150131005 A | 11/2015 | |
| KR | 20160118979 A | 10/2016 | |
| KR | 20170102876 A | 9/2017 | |
| KR | 101838337 B1 | 3/2018 | |
| KR | 1020190102572 A | 9/2019 | |
| KR | 1020200045790 A | 5/2020 | |
| KR | 1020200081442 A | 7/2020 | |
| KR | 102181313 B1 | 11/2020 | |
| KR | 102582604 B | 9/2023 | |
| WO | 2011040562 A1 | 4/2011 | |
| WO | 2013080946 A1 | 6/2013 | |
| WO | 2016017066 A1 | 2/2016 | |
| WO | 2018034094 A1 | 2/2018 | |
| WO | 2019/089429 A1 | 5/2019 | |
| WO | 2019089492 A1 | 5/2019 | |
| WO | WO 2019/089492 * | 5/2019 | ............ H01G 11/52 |
| WO | 2019164130 A1 | 8/2019 | |
| WO | 2019192475 A1 | 10/2019 | |
| WO | 2019242016 A1 | 12/2019 | |
| WO | 2020142702 A1 | 7/2020 | |
| WO | WO 2020/142702 * | 7/2020 | ............. H01M 2/16 |
| WO | 2020175079 A1 | 9/2020 | |
| WO | 2020175292 A1 | 9/2020 | |

OTHER PUBLICATIONS

International Search Report and Written Opinion, PCT/CN2020/132952, Jul. 9, 2021, 12 pgs.
First Office Action received in the counterpart Chinese application No. 202080103010.1, issued on Jun. 4, 2024.
Cancellation of utility model registration received in the corresponding Korean Patent No. 2582604, mailed Feb. 26, 2024.
Cancellation of utility model registration received in the corresponding Korean Patent No. 2537203, mailed Nov. 23, 2023.
Third Party Submission received in the corresponding European Application 20963115.9, mailed Feb. 16, 2024.
Cancellation of utility model registration received in the corresponding Korean Patent No. 2536847, mailed Nov. 23, 2023.
Third Party Submission received in the corresponding European Application 20963111.8, mailed Feb. 8, 2024.
First Office Action of CN Application No. 202080095489.9 and its English translation, 13 pages.
Notice of Allowance of CN Application No. 202080095489.9 and its English translation, 6 pages.
Richard S. Baldwin et al., "Battery Separator Characterization and Evaluation Procedures for NASA's Advanced Lithium-Ion Batteries", 70 pages.
F. Pennella et al., "A Survey of Methods for the Evaluation of Tissue Engineering Scaffold Permeability", 15 pages.
EESR of EP Application No. 20963115.9, 13 pages.
First Office Action of JP Application No. 2022-552619 and its English translation, 10 pages.
Second Office Action of JP Application No. 2022-552619 and its English translation, 8 pages.
Non-Final Office Action of U.S. Appl. No. 17/950,978, 17 pages.
Final Office Action of U.S. Appl. No. 17/950,978, 19 pages.
ISR of International Application No. PCT/CN2020/132955 and its translation, 8 pages.
First Office Action of CN Application No. 202080083061.2, 7 pages.
First Office Action of JP Application No. 2022-552622 and its English translation, 18 pages.
Second Office Action of JP Application No. 2022-552622 and its English translation, 10 pages.
First Office Action of JP Application No. 2024-034011 and its English translation, 26 pages.
EESR of EP Application No. 20963111.8, 12 pages.
Notification and Third Party Observation of JP Application No. 2024-34011 and its English translation, 2 pages.
First Office Action of KR Application No. 10-2022-7030299 and its English translation, 12 pages.
First Non-Final Office Action of U.S. Appl. No. 17/942,029, 18 pages.
Second Non-Final Office Action of U.S. Appl. No. 17/942,029, 24 pages.
First Final Office Action of U.S. Appl. No. 17/942,029, 17 pages.
Second Final Office Action of U.S. Appl. No. 17/942,029, 18 pages.
The extended European search report received in the counterpart European application No. 20963112.6, mailed on Oct. 11, 2024.
Decision to Dismiss Amendment of JP Application No. 2024-034011, mailed Apr. 15, 2025, 6 pages with English translation.

(56) References Cited

OTHER PUBLICATIONS

The Non-Final Office Action received in the counterpart U.S. Appl. No. 17/942,031, dated May 20, 2025, 17 pages.

Notice of Allowance, mailed Mar. 5, 2026, for U.S. Appl. No. 17/942,031.

Office Action, mailed May 8, 2026, for European Patent Application Serial No. 20963115.9.

Office Action, mailed May 13, 2026, for European Patent Application Serial No. 20963111.8.

Mettler-Toledo, "Thermal Analysis of Polymers—Selected Applications," Applications Handbook, 2022.

Baldwin et al, "Battery Separator Characterization and Evaluation Procedures for NASA's Advanced Lithium-Ion Batteries," NASA/TM-2010-216099, National Aeronautics and Space Administration, Glenn Research Center, May 2010, Retrieved from the Internet: <URL:https://ntrs.nasa.gov/archive/nasa/casi.ntrs.nasa.gov/20100021170.pdf>.

\* cited by examiner

5

SEPARATOR, PREPARATION METHOD THEREOF, AND SECONDARY BATTERY, BATTERY MODULE, BATTERY PACK, AND APPARATUS RELATED THERETO

CROSS-REFERENCE TO RELATED APPLICATION

This application is a continuation application of PCT Patent Application No. PCT/CN2020/132952, entitled "SEPARATOR, PREPARATION METHOD THEREFOR AND RELATED SECONDARY BATTERY THEREOF, BATTERY MODULE, BATTERY PACK AND DEVICE" filed on Nov. 30, 2020, which is incorporated herein by reference in its entirety.

TECHNICAL FIELD

This application relates to the electrochemical field, and more specifically, to a separator, a preparation method thereof, and a secondary battery, a battery module, a battery pack, and an apparatus related thereto.

BACKGROUND

Secondary batteries have been widely used since their commercialization as power sources of various mobile devices because of advantages such as high energy density, high working voltage, and long cycle life.

With continuous development of the new energy industry, higher requirements are imposed for the secondary batteries. For example, increasingly high energy density is designed for the secondary batteries. However, higher energy density of the secondary batteries is accompanied by higher requirements for other performance of the secondary batteries, such as safety performance, electrochemical performance, and kinetic performance.

Therefore, it is necessary to provide a secondary battery with both good cycling performance and safety performance.

SUMMARY

In view of the technical problem in the Background, a first aspect of this application provides a separator, so that a secondary battery containing the separator has both good cycling performance and safety performance.

To achieve the foregoing objective, the separator provided in the first aspect of this application includes a substrate and a coating layer provided on at least one surface of the substrate. The coating layer includes inorganic particles and organic particles. The organic particles include first organic particles, and the first organic particles are embedded into the inorganic particles and form bulges on a surface of the coating layer. A number-based median particle size of the first organic particles is ≥12 μm.

Compared with the prior art, this application includes at least the following beneficial effects:

The separator in this application includes the inorganic particles and the first organic particles in the same coating layer, the first organic particles are embedded into an inorganic particle layer and form bulges on the surface of the coating layer, and the number-based median particle size of the first organic particles is within a specific range, which can effectively improve cycling performance and safety performance of a battery.

In any embodiment of this application, the number-based median particle size of the first organic particles is 12 μm-25 μm, in some embodiments, 15 μm-20 μm. When the number-based median particle size of the first organic particles is within the given range, the cycling performance and safety performance of the battery can be further improved.

In any embodiment of this application, the first organic particles are secondary particles. When the first organic particles are secondary particles, the cycling performance of the battery can be further improved.

In any embodiment of this application, the first organic particle includes one or more of a homopolymer or copolymer containing fluoroalkenyl monomer units, a homopolymer or copolymer of alkenyl monomer units, a homopolymer or copolymer of unsaturated nitrile monomer units, a homopolymer or copolymer of epoxidate monomer units, and modified compounds of the foregoing homopolymers or copolymers.

In any embodiment of this application, the first organic particle includes one or more of polytetrafluoroethylene, polychlorctrifluoroethylene, polyvinyl fluoride, polyvinylidene fluoride, polyethylene, polypropylene, polyacrylonitrile, polyethylene oxide, a copolymer containing different fluoroalkenyl monomer units, a copolymer containing fluoroalkenyl monomer units and alkenyl monomer units, a copolymer containing fluoroalkenyl monomer units and acrylic acid monomer units, a copolymer containing fluoroalkenyl monomer units and acrylate monomer units, and modified compounds of the foregoing homopolymers or copolymers.

In any embodiment of this application, the first organic particle includes one or more of vinylidene fluoride-trifluoroethylene copolymer, vinylidene fluoride-hexafluoropropylene copolymer, vinylidene fluoride-trifluoroethylene-hexafluoropropylene copolymer, vinylidene fluoride-hexafluoropropylene-acrylic acid copolymer, vinylidene fluoride-hexafluoropropylene-acrylate copolymer, and modified compounds of the foregoing copolymers.

In any embodiment of this application, a mass percentage of the first organic particles in the coating layer is ≥12%, in some embodiments, the mass percentage of the first organic particles in the coating layer is 15%-25%.

In any embodiment of this application, a mass percentage of the inorganic particles in the coating layer is ≤85%, in some embodiments, the mass percentage of the inorganic particles in the coating layer is 65%-75%.

When the mass percentages of the first organic particles and the inorganic particles in the coating layer are within the given ranges, the first organic particles and the inorganic particles can better interact with each other, thereby further improving the cycling performance, safety performance, and energy density of the battery.

In any embodiment of this application, the organic particles further include second organic particles, the second organic particles are embedded into the inorganic particles and form bulges on a surface of the coating layer, and the second organic particles are primary particles. When the coating layer further includes the second organic particles in a form of the primary particles, the cycling performance and safety performance of the battery can be further improved.

In any embodiment of this application, a number-based median particle size of the second organic particles is ≥2 μm, in some embodiments, the number-based median particle size of the second organic particles is 2.5 μm-6 μm. When the number-based median particle size of the second organic particles is within the given range, the cycling performance and safety performance of the battery can be further improved.

In any embodiment of this application, a mass percentage of the second organic particles in the coating layer is less than the mass percentage of the first organic particles in the coating layer, in some embodiments, the mass percentage of the second organic particles in the coating layer is 2%-10%. When the mass percentage of the second organic particles in the coating layer is within the given range, the cycling performance and safety performance of the battery can be further improved.

In any embodiment of this application, a volume-based median particle size $D_v50$ of the inorganic particles is 0.5 $\mu$m-2.5 $\mu$m, in some embodiments, 0.5 $\mu$m-1 $\mu$m. When the volume-based median particle size $D_v50$ of the inorganic particles is within the given range, volumetric energy density of the battery can be further improved.

In any embodiment of this application, the inorganic particle includes one or more of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

In any embodiment of this application, an air permeability of the separator is 100 s/100 mL-300 s/100 mL, in some embodiments, the air permeability of the separator is 150 s/100 mL-250 s/100 mL.

In any embodiment of this application, a tensile strength in transverse direction (MD) of the separator is 1500 kgf/cm²-3000 kgf/cm², in some embodiments, the tensile strength in transverse direction of the separator is 1800 kgf/cm²-2500 kgf/cm².

In any embodiment of this application, a tensile strength in machine direction (TD) of the separator is 1000 kgf/cm²-2500 kgf/cm², in some embodiments, the tensile strength in machine direction of the separator is 1400 kgf/cm²-2000 kgf/cm².

In any embodiment of this application, a transverse elongation at break of the separator is 50%-200%, in some embodiments, the transverse elongation at break of the separator is 100%-150%.

In any embodiment of this application, a longitudinal elongation at break of the separator is 50%-200%, in some embodiments, the longitudinal elongation at break of the separator is 100%-150%.

In any embodiment of this application, the inorganic particles and the organic particles form uneven pore structures in the coating layer.

In any embodiment of this application, a distance between any two adjacent inorganic particles is denoted as L1, a distance between any adjacent inorganic particle and organic particle is denoted as L2, and L1<L2.

A second aspect of this application provides a method for preparing a separator, including the following steps: (1) providing a substrate; (2) providing a coating layer slurry, where the coating layer slurry includes constituent materials and a solvent, the constituent materials include inorganic particles and organic particles, and the organic particles include first organic particles; and (3) applying the coating layer slurry in step (2) on at least one side of the substrate in step (1) to form a coating layer, and performing drying to obtain the separator. The separator includes: the substrate; and the coating layer provided on at least one surface of the substrate, where the coating layer includes the inorganic particles and the organic particles, the organic particles include first organic particles, the first organic particles are embedded into the inorganic particles and form bulges on a surface of the coating layer, and a number-based median particle size of the first organic particles is ≥12 $\mu$m.

In any embodiment of this application, in step (2), the organic particles further include second organic particles, and the second organic particles are primary particles.

In any embodiment of this application, mass of the added second organic particles is less than or equal to mass of the added first organic particles; and in some embodiments, a percentage of the second organic particles in a total dry weight of the constituent materials is below 10%, and further 2%-10%.

In any embodiment of this application, in step (2), a percentage of the mass of the added first organic particles in the total dry weight of the constituent materials is above 12%, in some embodiments, 12%-30%.

In any embodiment of this application, in step (2), a solid content of the coating layer slurry is 28%-45%, in some embodiments, 30%-38%.

In any embodiment of this application, in step (3), a coater is used for the coating, the coater includes a gravure roller, and the number of lines of the gravure roller is 100 LPI-300 LPI, in some embodiments, 125 LPI-190 LPI.

In any embodiment of this application, in step (3), a speed of the coating is 30 m/min-90 m/min, in some embodiments, 50 m/min-70 m/min.

In any embodiment of this application, in step (3), a linear speed ratio of the coating is 0.8-2.5, in some embodiments, 0.8-1.5.

In any embodiment of this application, in step (3), a drying temperature is 40° C.-70° C., in some embodiments, 50° C.-60° C.

In any embodiment of this application, in step (3), drying time is 10 s-120 s, in some embodiments, 20 s-80 s.

A third aspect of this application provides a secondary battery, containing the separator according to the first aspect of this application or the separator prepared by using the method according to the second aspect of this application.

A fourth aspect of this application provides a battery module, including the secondary battery according to the third aspect of this application.

A fifth aspect of this application provides a battery pack, including the battery module according to the fourth aspect of this application.

A sixth aspect of this application provides an apparatus, including at least one of the secondary battery according to the third aspect of this application, the battery module according to the fourth aspect of this application, or the battery pack according to the fifth aspect of this application.

The battery module, the battery pack, and the apparatus in this application include the secondary battery in this application, and therefore have at least advantages that are the same as those of the secondary battery.

BRIEF DESCRIPTION OF DRAWINGS

To describe the technical solutions of this application more clearly, the following briefly describes the accompanying drawings used in this application. Apparently, the accompanying drawings in the following description show only some embodiments of this application, and a person of ordinary skill in the art may still derive other drawings from these accompanying drawings without creative efforts.

FIG. 1-2 is a schematic structural diagram of another embodiment of a separator according to this application.

FIG. 2 is a scanning electron microscope (SEM) image of an embodiment of a separator according to this application.

FIG. 4-1 is a schematic structural diagram of an embodiment of a separator according to this application.

FIG. 4-2 is a schematic structural diagram of another embodiment of a separator according to this application.

DESCRIPTION OF EMBODIMENTS

Figure 1:
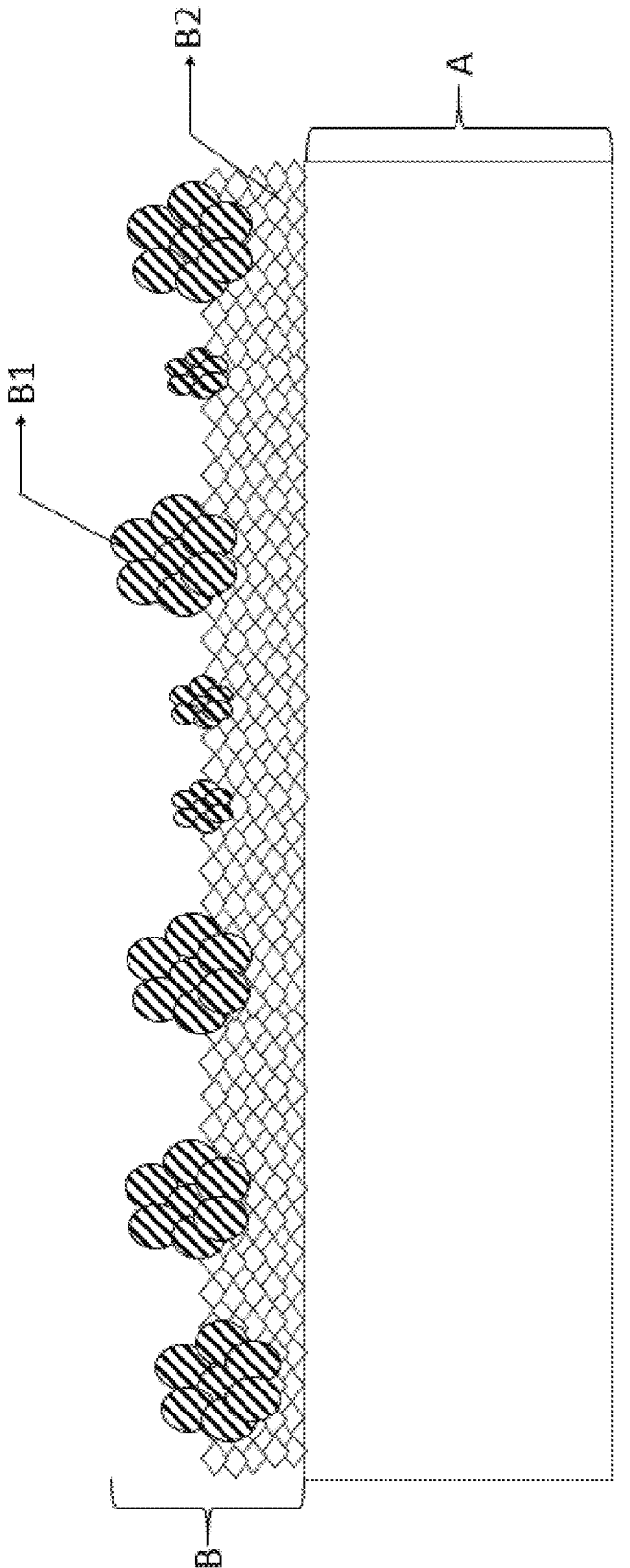
FIG. 1-1 is a schematic structural diagram of an embodiment of a separator according to this application.

The following further describes this application with reference to embodiments. It should be understood that these embodiments are merely intended to illustrate this application but not to limit the scope of this application.

For brevity, this specification specifically discloses only some numerical ranges. However, any lower limit may be combined with any upper limit to form an unspecified range, and any lower limit may be combined with another lower limit to form an unspecified range, and likewise, any upper limit may be combined with any other upper limit to form an unspecified range. In addition, each individually disclosed point or single numerical value, as a lower limit or an upper limit, may be combined with any other point or single numerical value or combined with another lower limit or upper limit to form an unspecified range.

In the descriptions of this specification, it should be noted that "more than" or "less than" is inclusive of the present number and that "more" in "one or more" means two or more than two, unless otherwise specified.

In the description of this specification, unless otherwise specified, a term "or (or)" indicates inclusion. That is, a phrase "A or (or) B" means "A, B, or both A and B". More specifically, any of the following conditions satisfies the condition "A or B": A is true (or present) and B is false (or not present); A is false (or not present) and B is true (or present); or both A and B are true (or present).

Unless otherwise specified, terms used in this application have well-known meanings generally understood by persons skilled in the art. Unless otherwise specified, numerical values of parameters mentioned in this application may be measured by using various measurement methods commonly used in the art (for example, testing may be performed by using a method provided in the examples of this application).

Secondary Battery

A secondary battery is a battery that can be charged after being discharged to activate active materials for continuous use.

Usually, the secondary battery includes a positive electrode plate, a negative electrode plate, a separator, and an electrolyte. In a battery charging/discharging process, active ions are intercalated and deintercalated back and forth between the positive electrode plate and the negative electrode plate. The separator is disposed between the positive electrode plate and the negative electrode plate to provide separation. The electrolyte migrates ions between the positive electrode plate and the negative electrode plate.

[Separator]

The separator provided in this application includes a substrate and a coating layer provided on at least one surface of the substrate, where the coating layer includes inorganic particles and organic particles, the organic particles include first organic particles, the first organic particles are embedded into the inorganic particles and form bulges on a surface of the coating layer, and a number-based median particle size of the first organic particles is ≥12 μm.

It should be noted that a number-based median particle size of the organic particles is an arithmetic average value of particle sizes of the organic particles based on the number of the organic particles in the coating layer of the separator. The particle size of the organic particle is a distance between two farthest points on the organic particle.

The separator in this application includes the inorganic particles and the first organic particles in the same coating layer, and compared with a separator with two coating layers of an inorganic particle layer and an organic particle layer, the separator has greatly reduced overall thickness, thereby improving energy density of the battery. In addition, a structure of the first organic particle is specially designed, allowing the battery containing the separator in this application to have good cycling performance and safety performance.

Without wishing to be bound by any theory, in the separator in this application, the first organic particles are specially designed, so that sufficient uneven pore structures exist between the particles. Even if the organic particles swell in electrolyte, sufficient ion migration channels can be formed to effectively ensure interface stability inside the battery, thereby improving the cycling performance of the battery. In addition, wrinkling of the separator during battery cycling can also be reduced, effectively reducing a probability of short circuit at positive and negative electrodes, and improving the safety performance of the battery.

As shown in FIG. 1-1, the separator includes a substrate (A) and a coating layer (B), where the coating layer (B) includes first organic particles (B1) and inorganic particles (B2), the first organic particles (B1) are secondary particles, and the first organic particles are embedded into an inorganic particle layer formed by the inorganic particles (B2) and form bulges on a surface of the inorganic particle layer.

The inventors have found through in-depth research that when the separator in this application satisfies the foregoing design conditions and optionally satisfies one or more of the following conditions, performance of a secondary battery can be further improved.

In some embodiments, a number-based median particle size of the first organic particles is 12 μm-25 μm, for example, 15 μm-20 μm. When the number-based median particle size of the first organic particles is within the given range, the first organic particles have an appropriate swelling rate in electrolyte, which ensures sufficient ion migration channels and improves adhesion between the separator and electrode plates, further improving cycling performance and safety performance of the battery.

In some embodiments, the first organic particles are secondary particles. When the first organic particles are secondary particles, an even coating layer interface is formed, thereby further improving the safety performance of the battery.

It should be noted that the secondary particles have meanings well-known in the art. The secondary particles are particles in agglomeration formed by accumulating two or more primary particles.

In some embodiments, the first organic particles may be formed by agglomerating primary particles with particle sizes of 150 nm-300 nm.

In some embodiments, the first organic particle may include one or more of a homopolymer or copolymer containing fluoroalkenyl monomer units, a homopolymer or copolymer of alkenyl monomer units, a homopolymer or copolymer of unsaturated nitrile monomer units, a homopolymer or copolymer of epoxidate monomer units, and modified compounds of the foregoing homopolymers or copolymers.

In some embodiments, the fluoroalkenyl monomer unit may be selected from one or more of difluoroethylene, vinylidene fluoride, trifluoroethylene, chlorotrifluoroethylene, tetrafluoroethylene, and hexafluoropropylene.

In some embodiments, the alkenyl monomer unit may be selected from one or more of ethylene, propylene, butadiene, and isoprene.

In some embodiments, the unsaturated nitrile monomer unit may be selected from one or more of acrylonitrile and methyl acrylonitrile.

In some embodiments, the epoxidate monomer unit may be selected from one or more of ethylene oxide and propylene oxide.

In some embodiments, the first organic particle may include one or more of polytetrafluoroethylene, polychlorctrifluoroethylene, polyvinyl fluoride, polyvinylidene fluoride, polyethylene, polypropylene, polyacrylonitrile, polyethylene oxide, a copolymer containing different fluoroalkenyl monomer units, a copolymer containing fluoroalkenyl monomer units and alkenyl monomer units, a copolymer containing fluoroalkenyl monomer units and acrylic acid monomer units, a copolymer containing fluoroalkenyl monomer units and acrylate monomer units, and modified compounds of the foregoing homopolymers or copolymers.

In some embodiments, the first organic particle may include one or more of vinylidene fluoride-trifluoroethylene copolymer, vinylidene fluoride-hexafluoropropylene copolymer, vinylidene fluoride-trifluoroethylene-hexafluoropropylene copolymer, vinylidene fluoride-hexafluoropropylene-acrylic acid copolymer, vinylidene fluoride-hexafluoropropylene-acrylate copolymer, and modified compounds of the foregoing copolymers.

In some embodiments, the first organic particle is one or more of polyvinylidene fluoride, vinylidene fluoride-hexafluoropropylene copolymer, and modified compounds of the foregoing homopolymers or copolymers.

In some embodiments, a mass percentage of the first organic particles in the coating layer is ≥12%, in some embodiments, the mass percentage of the first organic particles in the coating layer is 15%-25% and 20%-25%. When the mass percentage of the first organic particles in the coating layer is controlled within the given range, interface stability between the separator and the electrode plates can be improved and the separator can consume less electrolyte, further improving the cycling performance and safety performance of the battery.

In some embodiments, a mass percentage of the inorganic particles in the coating layer is ≤85%. For example, the mass percentage of the inorganic particles in the coating layer is 65%-75%. When the mass percentage of the inorganic particles in the coating layer is controlled within the given range, mass energy density of the battery can be further improved with good safety performance of the battery ensured.

In some embodiments, the organic particles further include second organic particles, the second organic particles are embedded into the inorganic particles and form bulges on a surface of the coating layer, and the second organic particles are primary particles. When the battery is in a proper operating environment (for example, 45° C. or below), the first organic particles are used in combination with the second organic particles to effectively reduce a probability that the organic particles in the coating layer form a dense adhesive film with a large area after swelling in the electrolyte, allowing the coating layer of the separator to have appropriately uneven pore structures, helping migration of active ions, and further improving the cycling performance of the battery. Specially, when the battery is in a high-temperature operating environment (for example, 100° C. or above), the first organic particles and the second organic particles form an adhesive film structure with a large area under the high temperature, rapidly decreasing channels for active ions to diffuse, increasing heat spreading time, and further improving the safety performance of the battery.

It should be noted that the primary particles have meanings well-known in the art. The primary particles refer to particles not in agglomeration.

Figures 1, 2:
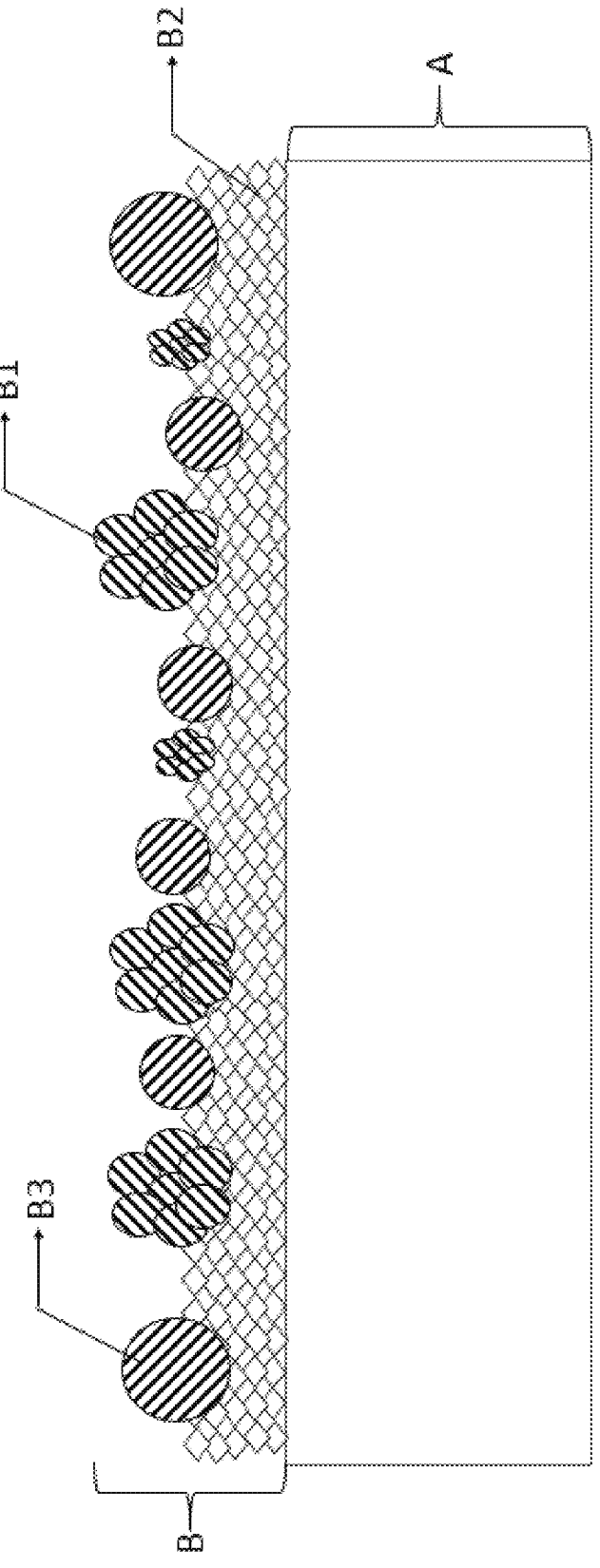
Figure 2:
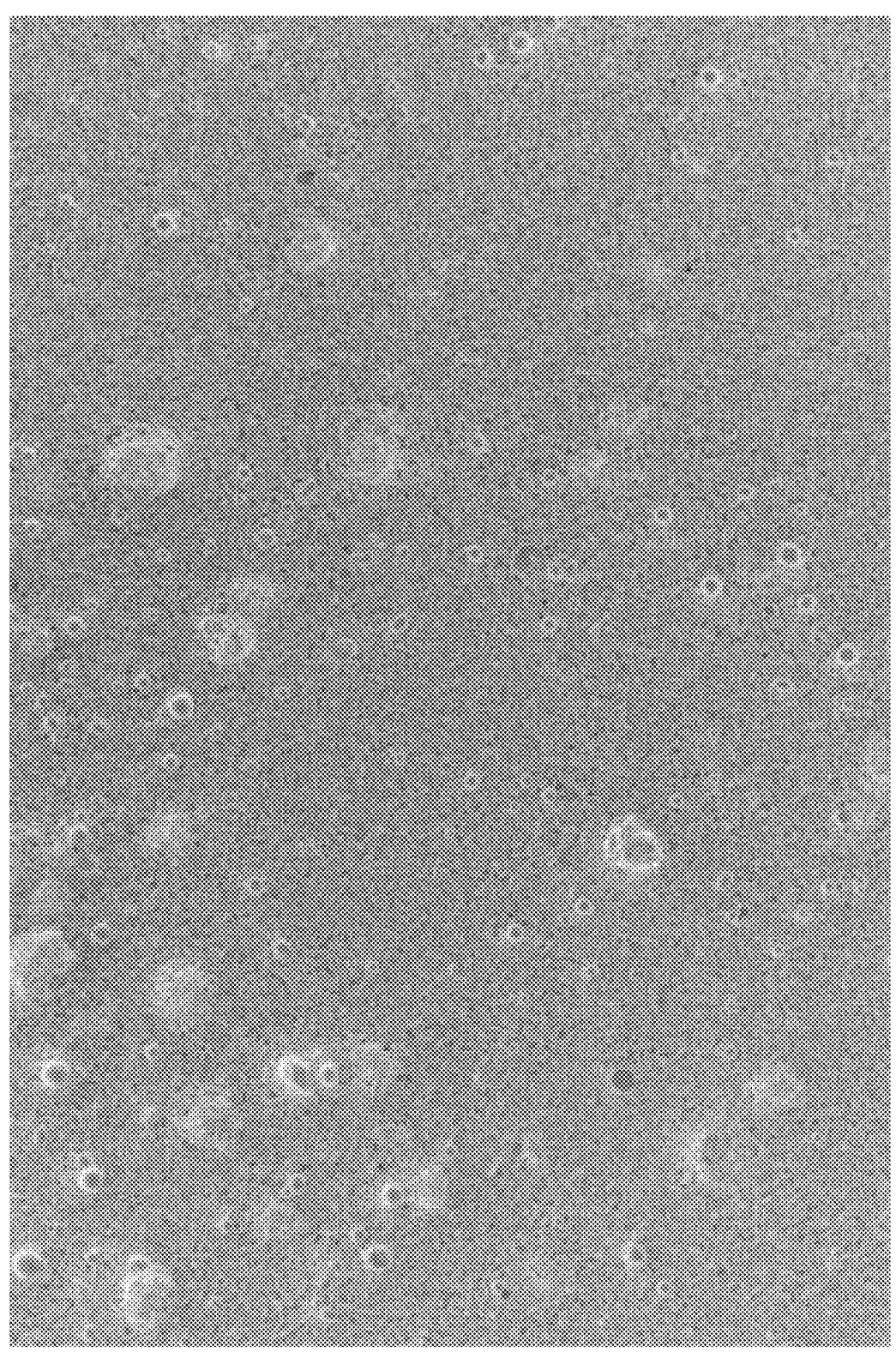

As shown in FIG. 1-2, the separator includes a substrate (A) and a coating layer (B), where the coating layer (B) includes first organic particles (B1), inorganic particles (B2), and second organic particles (B3), the first organic particles (B1) are secondary particles, the second organic particles (B3) are primary particles, and the first organic particles (B1) and the second organic particles (B3) are both embedded into an inorganic particle layer formed by the inorganic particles (B2) and form bulges on a surface of the inorganic particle layer.

In some embodiments, a number-based median particle size of the second organic particles is ≥2 μm. For example, the number-based median particle size of the second organic particles is 2.5 μm-7 μm or 2.5 μm-6 μm. When the number-based median particle size of the second organic particles is within the given range, the cycling performance and safety performance of the battery can be further improved. If the number-based median particle size of the second organic particles is too small (for example, less than 2 μm), the second organic particles easily swell in electrolyte to form an adhesive film structure, which blocks ion migration channels when the battery operates properly, affecting the cycling performance of the battery. If the number-based median particle size of the second organic particles is too large (for example, greater than 10 μm), after hot pressing during preparation of the battery, the separator may be too firmly bonded to electrode plates, causing poor infiltration of the electrolyte, and affecting the cycling performance of the battery.

In some embodiments, the second organic particle may include one or more of a homopolymer or copolymer of acrylate monomer units, a homopolymer or copolymer of acrylic acid monomer units, a homopolymer or copolymer of styrene monomer units, polyurethane compound, rubber compound, and modified compounds of the foregoing homopolymers or copolymers.

In some embodiments, the second organic particle may include one or more of a copolymer of acrylate monomer units and styrene monomer units, a copolymer of acrylic acid monomer units and styrene monomer units, a copolymer of acrylic acid monomer units-acrylate monomer units-styrene monomer units, a copolymer of styrene monomer units and unsaturated nitrile monomer units, a copolymer of styrene monomer units-alkenyl monomer units-unsaturated nitrile monomer units, and modified compounds of the foregoing copolymers.

In some embodiments, the acrylate monomer unit may be selected from one or more of methyl acrylate, ethyl acrylate, propyl acrylate, butyl acrylate, methyl methacrylate, butyl methacrylate, and isooctyl methacrylate.

In some embodiments, the acrylic acid monomer unit may be selected from one or more of acrylic acid and methacrylic acid.

In some embodiments, the styrene monomer unit may be selected from one or more of styrene and methyl styrene.

In some embodiments, the unsaturated nitrile monomer unit may be selected from one or more of acrylonitrile and methyl acrylonitrile.

In some embodiments, the second organic particle may include one or more of butyl acrylate-styrene copolymer, butyl methacrylate-isooctyl methacrylate copolymer, isooctyl methacrylate-styrene copolymer, methacrylate-methacrylic acid-styrene copolymer, methyl acrylate-isooctyl methacrylate-styrene copolymer, butyl acrylate-isooctyl acrylate-styrene copolymer, butyl acrylate-isooctyl methacrylate-styrene copolymer, butyl methacrylate-isooctyl acrylate-styrene copolymer, butyl methacrylate-isooctyl methacrylate-styrene copolymer, styrene-acrylonitrile copolymer, styrene-butadiene-acrylonitrile copolymer, methyl acrylate-styrene-acrylonitrile copolymer, isooctyl methacrylate-styrene-acrylonitrile copolymer, styrene-vinyl acetate copolymer, styrene-vinyl acetate-pyrrolidone copolymer, and modified compounds of the foregoing copolymers.

In some embodiments, a mass percentage of the second organic particles in the coating layer is less than a mass percentage of the first organic particles in the coating layer. For example, the mass percentage of the second organic particles in the coating layer is 2%-10%, 3%-8%, 4%-9%, 5%-10%, or the like. When the mass percentage of the second organic particles is controlled within the given range, the coating layer of the separator has appropriate pore structures with adhesion ensured, further improving the cycling performance and safety performance of the battery.

In some embodiments, a volume-based median particle size $D_v50$ of the inorganic particles is 0.5 μm-2.5 μm, for example, 0.5 μm-1 μm. When the volume-based median particle size $D_v50$ of the inorganic particles is controlled within the given range, volumetric energy density of the battery can be further improved with good cycling performance and safety performance of the battery ensured.

In some embodiments, the inorganic particle includes one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$). For example, the inorganic particle may include one or more of boehmite (γ-AlOOH) and aluminum oxide ($Al_2O_3$).

In some embodiments, coating weight per unit area on a single surface of the separator is ≤3.0 g/m². For example, the coating weight per unit area on the single surface of the separator may be 1.5 g/m²-3.0 g/m², 1.5 g/m²-2.5 g/m², or 1.8 g/m²-2.3 g/m². When the coating weight per unit area on the single surface of the separator is controlled within the given range, both the cycling performance and safety performance of the battery can be further ensured with energy density of the battery improved.

In some embodiments, the coating layer may further include other organic compounds, for example, a polymer for improving heat resistance ("heat-resistant adhesive" for short), a dispersant, a wetting agent, a binder of another type, and the like. The foregoing other organic compounds are all non-granular substances in the coating layer. This application imposes no particular limitation on types of the foregoing other organic compounds, which may be any well-known material with good improvement performance.

The embodiments of this application impose no particular limitation on a material of the substrate, which may be any well-known substrate with good chemical stability and mechanical stability, for example, one or more of glass fiber, non-woven fabric, polyethylene, polypropylene, and polyvinylidene fluoride. The substrate may be a single-layer thin film or a multi-layer composite thin film. When the substrate is a multi-layer composite thin film, all its layers may be made of a same material or different materials.

In some embodiments, thickness of the substrate is ≤10 μm. For example, the thickness of the substrate may be 5 μm-10 μm, 5 μm-9 μm, or 7 μm-9 μm. When the thickness of the substrate is controlled within the given range, the energy density of the battery can be further improved with the cycling performance and safety performance of the battery ensured.

In some embodiments, an air permeability of the separator is 100 s/100 mL-300 s/100 mL. For example, the air permeability of the separator is 150 s/100 mL-250 s/100 mL or 170 s/100 mL-220 s/100 mL.

In some embodiments, a tensile strength in transverse direction (MD) of the separator is 1500 kgf/cm²-3000 kgf/cm². For example, the tensile strength in transverse direction of the separator is 1800 kgf/cm²-2500 kgf/cm².

In some embodiments, a tensile strength in machine direction (TD) of the separator is 1000 kgf/cm²-2500 kgf/cm². For example, the tensile strength in machine direction of the separator is 1400 kgf/cm²-2000 kgf/cm².

In some embodiments, a transverse elongation at break of the separator is 50%-200%. For example, the transverse elongation at break of the separator is 100%-150%.

In some embodiments, a longitudinal elongation at break of the separator is 50%-200%. For example, the longitudinal elongation at break of the separator is 100%-150%.

In some embodiments, a distance between any two adjacent inorganic particles is denoted as L1, a distance between any adjacent inorganic particle and organic particle is denoted as L2, and L1<L2.

Method for Testing Relevant Parameters

According to some examples, the particle size and number-based median particle size of the organic particles may be tested by using a device and method known in the art. For example, a scanning electron microscope (for example, ZEISS Sigma 300) is used, with reference to JY/T010-1996, to obtain a scanning electron microscope (SEM) image of the separator. In an example, the following test method may be used: selecting any test sample with length×width=50 mm×100 mm on the separator, randomly selecting a plurality of (for example, 5) test regions of the test sample, reading a particle size (that is, a distance between two farthest points on the organic particle is referred to as the particle size of the organic particle) of each organic particle in each test region at a magnification (for example, 500 times for measuring the first organic particles and 1000 times for measuring the second organic particles), obtaining the number and particle size values of the organic particles in each test region, and taking an arithmetic average value of the particle sizes of the organic particles in all test regions as the number-based median particle size of the organic particles in the test sample. To ensure accuracy of the test results, a plurality of (for example, 10) test samples can be taken to repeat the foregoing test, and an average value of the test samples is taken as a final test result.

FIG. 2 is a scanning electron microscope (SEM) image of an embodiment of a separator according to this application. It can be seen from FIG. 2 that a coating layer of the separator includes first organic particles and second organic particles, and the first organic particles and the second organic particles are embedded into an inorganic particle layer and form bulges on a surface of the inorganic particle layer. Particle sizes and a number-based median particle size of the organic particles in FIG. 2 may be measured by using the foregoing method.

According to some examples, morphologies of the organic particles (for example, a primary particle morphology or a secondary particle morphology) may be tested by using a device and method known in the art. For example, an ion beam cross-section polisher (CP) image may be used for the test. In an example, the following steps may be performed: first cutting the separator into a to-be-tested sample of a specific size (for example, 6 mm×6 mm), holding the to-be-tested sample by using two electrically and thermally conductive sheets (for example, copper foil), sticking and fastening the to-be-tested sample and the sheets by using an adhesive (for example, a double-sided adhesive), and using a flat iron block of a specific mass (for example, 400 g) for pressing for a specific time (for example, 1 hour) to make a smaller gap between the to-be-tested sample and the copper foil, then cutting edges with scissors for alignment, sticking the to-be-tested sample and the copper foil to a sample stage with a conductive adhesive, with the sample slightly protruding from the edge of the sample stage, loading the sample stage into a sample holder and locking the sample stage in place, powering on an argon ion beam cross-section polisher (for example, IB-19500CP) and evacuating the polisher (for example, 10 Pa-4 Pa), setting an argon flow (for example, 0.15 MPa), a voltage (for example, 8 kV), and a polishing time (for example, 2 hours), adjusting the sample stage to rocking mode to start polishing, and using a scanning electron microscope (for example, ZEISS Sigma 300) to finally obtain the ion beam cross-section polisher (CP) image of the to-be-tested sample.

Figure 3:
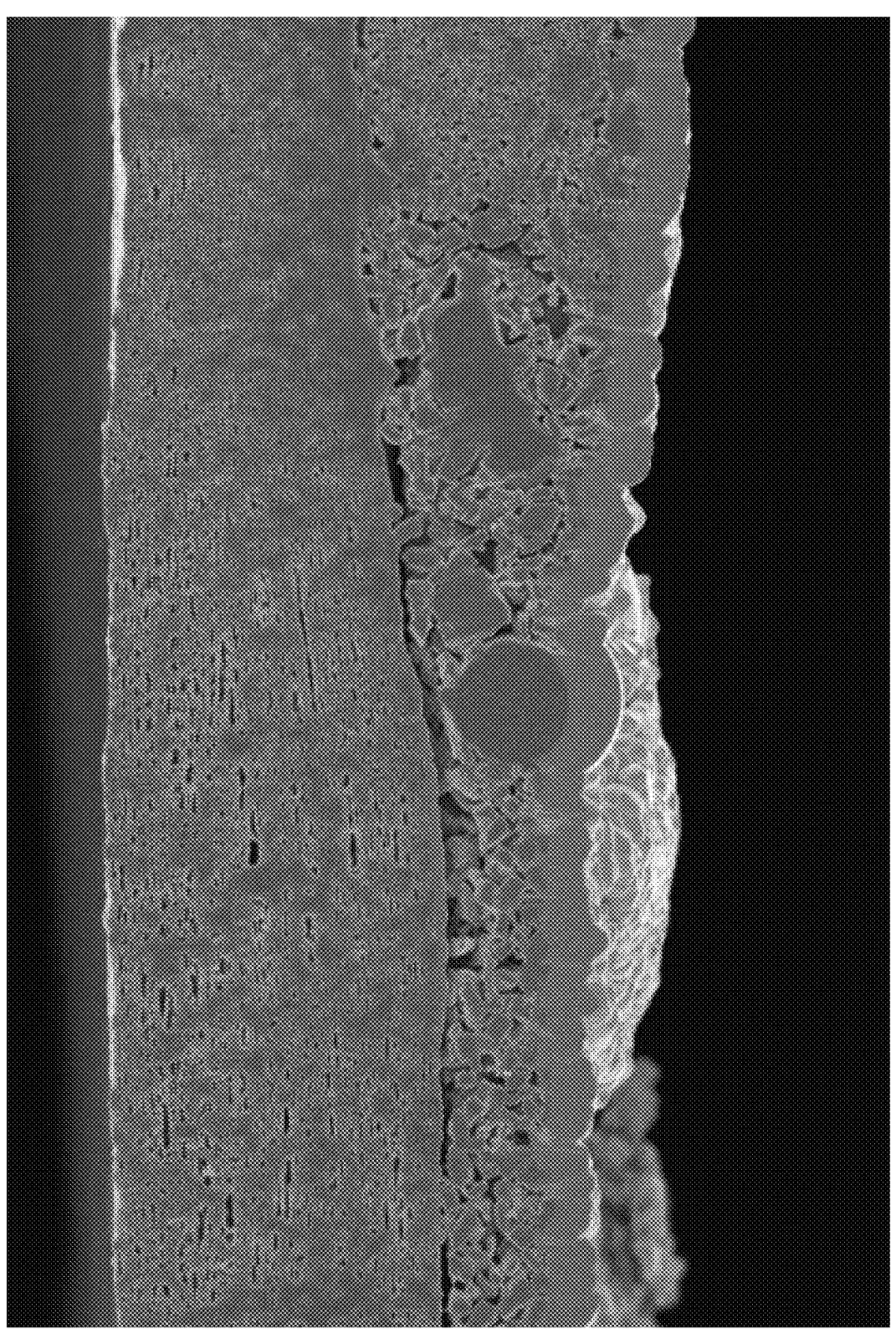
FIG. 3 is an ion beam cross-section polisher (CP) image of an embodiment of a separator according to this application.

FIG. 3 is an ion beam cross-section polisher (CP) image of a separator according to an embodiment of this application. It can be seen from FIG. 3 that a coating layer of the separator includes first organic particles and second organic particles, the first organic particle is a secondary particle made up by a plurality of primary particles and has an irregular non-solid sphere section, and the second organic particle is a non-agglomerated primary particle and has a solid sphere section.

According to some examples, substance types of the organic particles may be tested by using a device and method known in the art. For example, infrared spectroscopy of a material may be tested to determine its characteristic peak, so as to determine the substance type. Specifically, an infrared spectrum analysis may be performed on the organic particles by using an instrument and a method well-known in the art, such as an infrared spectrometer. For example, an IS10 Fourier transform infrared spectrometer from Nicolet (nicolet) of the United States is used for the test with reference to GB/T 6040-2002 general rules for infrared analysis.

According to some examples, a volume-based median particle size $D_v50$ of the inorganic particles has a meaning well-known in the art, and may be measured by using an instrument and a method known in the art. For example, with reference to GB/T 19077-2016 particle size distribution laser diffraction method, a laser particle size analyzer (for example, Master Size 3000) may be used for measurement.

According to some examples, air permeability, tensile strength in transverse direction (MD), tensile strength in machine direction (TD), transverse elongation at break, and longitudinal elongation at break of the separator all have meanings well-known in the art, and may be measured by using a method known in the art. For example, all of them may be measured with reference to GB/T 36363-2018.

According to some examples, a distance between any two adjacent inorganic particles means that: in an SEM image of the separator, any two adjacent inorganic particles in the coating layer are taken (when the inorganic particle is irregular, its circumscribed circle may be taken), and the distance between the centers of the two inorganic particles is measured as the distance between the two inorganic particles and is denoted as L1.

According to some examples, a distance between any adjacent inorganic particle and organic particle means that: in an SEM image of the separator, any two adjacent inorganic particle and organic particle in the coating layer are taken (when the inorganic particle or the organic particle is irregular, its circumscribed circle may be taken), and the distance between the centers of the inorganic particle and the organic particle is measured as the distance between the inorganic particle and the organic particle and is denoted as L2. The organic particle may be the first organic particle or the second organic particle.

The distance may be measured by using an instrument known in the art. For example, a scanning electron microscope may be used for measurement. In an example, the distance L2 between any adjacent inorganic particle and organic particle may be measured by using the following method: making the separator into a test sample with length×width=50 mm×100 mm, and using the scanning electron microscope (for example, ZEISS Sigma 300) to test the separator. For the test, refer to JY/T010-1996. A region of the test sample is randomly selected for scanning and test, and an SEM image of the separator is obtained at a magnification (for example, 3000 times). Any adjacent inorganic particle and organic particle in the SEM image are selected (when the inorganic particle or the organic particle is irregular, its circumscribed circle may be taken), and the distance between the center of the inorganic particle (or its circumscribed circle) and the center of the organic particle (or its circumscribed circle) is measured as the distance between the adjacent inorganic particle and organic particle in this application and is denoted as L2. To ensure accuracy of the test results, a plurality of (for example, 10) groups of adjacent particles of the test sample can be taken to repeat the foregoing test, and an average value of the test results of the groups is taken as a final result.

Similarly, the distance L1 between any two adjacent inorganic particles may also be measured by using the foregoing method.

This application further provides a method for preparing a separator, including the following steps:

(1) providing a substrate;

(2) providing a coating layer slurry, where the coating layer slurry includes constituent materials and a solvent, the constituent materials include inorganic particles and organic particles, and the organic particles include first organic particles; and (3) applying the coating layer slurry in step (2) on at least one side of the substrate in step (1) to form a coating layer, and performing drying to obtain the separator.

The separator includes: the substrate; and the coating layer provided on at least one surface of the substrate, where the coating layer includes the inorganic particles and the organic particles, the organic particles include the first organic particles, the first organic particles are embedded into the inorganic particles and form bulges on a surface of the coating layer, and a number-based median particle size of the first organic particles is ≥12 μm.

The coating layer may be provided on only one surface of the substrate or two surfaces of the substrate.

Figures 1, 2, 4:
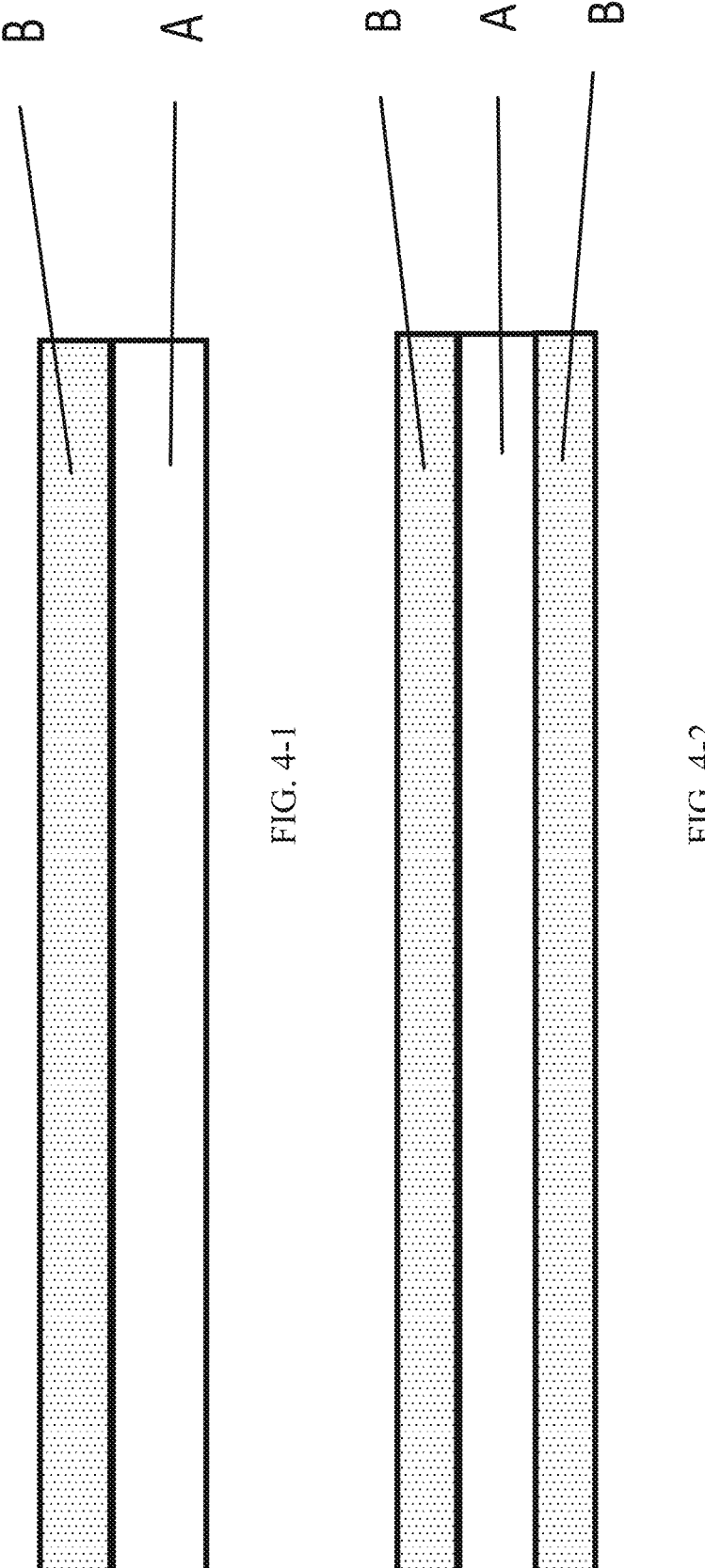

As shown in FIG. 4-1, a separator includes a substrate (A) and a coating layer (B), and the coating layer (B) is provided on only one surface of the substrate (A).

As shown in FIG. 4-2, a separator includes a substrate (A) and a coating layer (B), and the coating layer (B) is provided on two surfaces of the substrate (A).

The embodiments of this application impose no particular limitation on a material of the substrate, which may be any well-known substrate with good chemical stability and mechanical stability, for example, one or more of glass fiber, non-woven fabric, polyethylene, polypropylene, and polyvinylidene fluoride. The substrate may be a single-layer thin film or a multi-layer composite thin film. When the substrate is a multi-layer composite thin film, all its layers may be made of a same material or different materials.

In some embodiments, in step (2), the solvent may be water, such as deionized water.

In some embodiments, in step (2), the constituent materials may further include the foregoing second organic particles. For parameters of the second organic particles, refer to the foregoing content. Details are not described herein again.

In some embodiments, in step (2), the constituent materials may further include other organic compounds, for example, may further include a polymer for improving heat resistance, a dispersant, a wetting agent, and a binder of another type. The other organic compounds are all non-granular in the dried coating layer.

In some embodiments, in step (2), the coating layer slurry is obtained by adding the constituent materials into the solvent and stirring them uniformly.

In some embodiments, in step (2), a percentage of mass of the added first organic particles in a total dry weight of the constituent materials is above 12%, for example, 12%-30%, 15%-30%, 15%-25%, 15%-20%, or 16%-22%.

In some embodiments, in step (2), a percentage of mass of the added second organic particles in the total dry weight of the constituent materials is below 10%, for example, 2%-10%, 3%-7%, or 3%-5%.

It should be noted that when the constituent material is in a solid state, a dry weight of the constituent material is mass of the added constituent material. When the constituent material is a suspension, an emulsion, or a solution, a dry weight of the constituent material is a product of mass of the added constituent material and a solid content of the constituent material. The total dry weight of the constituent materials is a sum of dry weights of the constituent materials.

In some embodiments, in step (2), a solid content of the coating layer slurry may be controlled within 28%-45%, for example, 30%-38%. When the solid content of the coating layer slurry is within the foregoing range, a problem related to a membrane surface of the coating layer can be effectively avoided and a probability of uneven coating can be reduced, thereby further improving cycling performance and safety performance of a battery.

In some embodiments, in step (3), a coater is used for the coating.

In the embodiments of this application, a model of the coater is not specially limited, and the coater may be a coater purchased on the market.

In some embodiments, in step (3), the coating may be processes such as transfer coating, rotary spraying, and dip coating. For example, the coating is the transfer coating.

In some embodiments, the coater includes a gravure roller, and the gravure roller is used for transferring the coating layer slurry to the substrate.

In some embodiments, the number of lines of the gravure roller may be 100 LPI-300 LPI, for example, 125 LPI-190 LPI (LPI is line per inch). When the number of lines of the gravure roller is within the foregoing range, this helps control the number of the first organic particles and the second organic particles, thereby further improving cycling performance and safety performance of the separator.

In some embodiments, in step (3), a speed of the coating may be controlled within 30 m/min-90 m/min, for example, 50 m/min-70 m/min. When the speed of the coating is within the foregoing range, the problem related to the membrane surface of the coating layer can be effectively avoided and the probability of the uneven coating can be reduced, thereby further improving the cycling performance and safety performance of the battery.

In some embodiments, in step (3), a linear speed ratio of the coating may be controlled within 0.8-2.5, for example, may be 0.8-1.5 or 1.0-1.5.

In some embodiments, in step (3), a drying temperature may be 40° C.-70° C., for example, may be 50° C.-60° C.

In some embodiments, in step (3), drying time may be 10 s-120 s, for example, may be 20 s-80 s or 20 s-40 s.

Controlling the foregoing process parameters within the given ranges can further improve use performance of the separator in this application. Persons skilled in the art may choose to adjust one or more of the foregoing process parameters based on actual production conditions.

To further improve performance of a secondary battery, the inorganic particles and the organic particles optionally satisfy one or more of the foregoing parameter conditions. Details are not described herein again.

The substrate, the first organic particles, and the second organic particles may all be purchased on the market.

According to the method for preparing the separator in this application, the coating layer is obtained by coating for once, greatly simplifying production processes of the separator. In addition, applying the separator prepared by using the foregoing method to the battery can effectively improve storage performance and safety performance of the battery.

[Positive Electrode Plate]

In a secondary battery, the positive electrode plate usually includes a positive electrode current collector and a positive electrode film layer provided on the positive electrode current collector, where the positive electrode film layer includes a positive electrode active material.

The positive electrode current collector may be a conventional metal foil or a composite current collector (a metal material may be provided on a polymer matrix to form the composite current collector). In an example, the positive electrode current collector may be an aluminum foil.

The positive electrode active material is not limited to any specific type, any active material that is known in the art and that can be used for positive electrodes of secondary batteries may be used, and persons skilled in the art can make selection according to actual demands.

In an example, the positive electrode active material may include but is not limited to one or more of lithium transition metal oxide, olivine-structured lithium-containing phosphate, and their respective modified compounds. An example of the lithium transition metal oxide may include but is not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. An example of the olivine-structured lithium-containing phosphate may include but is not limited to one or more of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and modified compounds thereof. These materials are all commercially available.

In some embodiments, the modified compounds of the foregoing materials may be obtained through doping modification and/or surface coating modification to the materials.

Usually, the positive electrode film layer further optionally includes a binder, a conductive agent, and other optional additives.

In an example, the conductive agent may be one or more of superconducting carbon, acetylene black, carbon black, Ketjen black, carbon dot, carbon nanotube, Super P (SP), graphene, and carbon nanofiber.

In an example, the binder may be one or more of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

[Negative Electrode Plate]

In a secondary battery, the negative electrode plate usually includes a negative electrode current collector and a negative electrode film layer provided on the negative electrode current collector, where the negative electrode film layer includes a negative electrode active material.

The negative electrode current collector may be a conventional metal foil or a composite current collector (for example, a metal material may be provided on a polymer matrix to form the composite current collector). In an example, the negative electrode current collector may be a copper foil.

The negative electrode active material is not limited to any specific type, any active material that is known in the art and that can be used for negative electrodes of secondary batteries may be used, and persons skilled in the art can make selection according to actual demands. In an example, the negative electrode active material may include but is not limited to one or more of artificial graphite, natural graphite, hard carbon, soft carbon, a silicon-based material, and a tin-based material. The silicon-based material may be selected from one or more of elemental silicon, a silicon-oxygen compound (such as silicon monoxide), a silicon-carbon composite, a silicon-nitrogen composite, and a silicon alloy. The tin-based material may be selected from one or more of elemental tin, a tin-oxygen compound, and a tin alloy. These materials are all commercially available.

In some embodiments, to further improve energy density of the battery, the negative electrode active material includes the silicon-based material.

Usually, the negative electrode film layer further optionally includes a binder, a conductive agent, and other optional additives.

In an example, the conductive agent may be one or more of superconducting carbon, acetylene black, carbon black, Ketjen black, carbon dot, carbon nanotube, graphene, and carbon nanofiber.

In an example, the binder may be one or more of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyvinyl alcohol (PVA), and polyvinyl butyral (PVB).

In an example, the other optional additives may be a thickener and a dispersant (such as sodium carboxymethyl cellulose CMC-Na), a PTC thermistor material, and the like.

[Electrolyte]

A secondary battery may include an electrolyte, and the electrolyte migrates ions between a positive electrode and a negative electrode. The electrolyte may include an electrolytic salt and a solvent.

In an example, the electrolytic salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethane)sulfonimide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP), and lithium tetrafluoro oxalato phosphate (LiTFOP).

In an example, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-gamma-butyrolactone (GBL), sulfolane (SF), methyl sulfonyl methane (MSM), ethyl methanesulfonate (EMS), and diethyl sulfone (ESE).

In some embodiments, the electrolyte further includes an additive. For example, the additive may include a negative electrode film forming additive, or may include a positive electrode film forming additive, or may include an additive capable of improving some performance of a battery, for example, an additive for improving over-charge performance of the battery, an additive for improving high-temperature performance of the battery, and an additive for improving low-temperature performance of the battery.

In some embodiments, the secondary battery in this application is a lithium-ion secondary battery.

The embodiments of this application impose no particular limitation on a shape of the secondary battery, which may be

17

Figure 5:
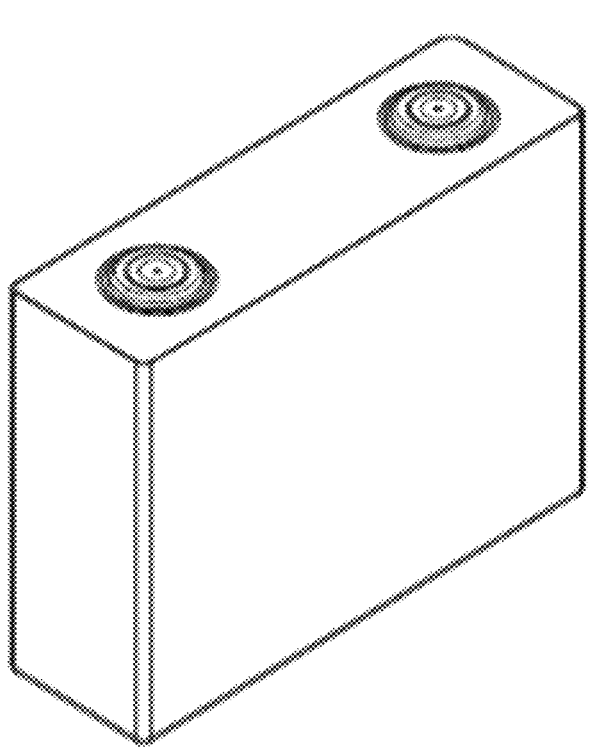
FIG. 5 is a schematic diagram of an embodiment of a secondary battery.

18 of a cylindrical shape, a rectangular shape, or any other shapes. FIG. 5 shows a secondary battery 5 of a rectangular structure as an example.

In some embodiments, the secondary battery may include an outer package. The outer package is used for packaging a positive electrode plate, a negative electrode plate, and an electrolyte.

Figure 6:
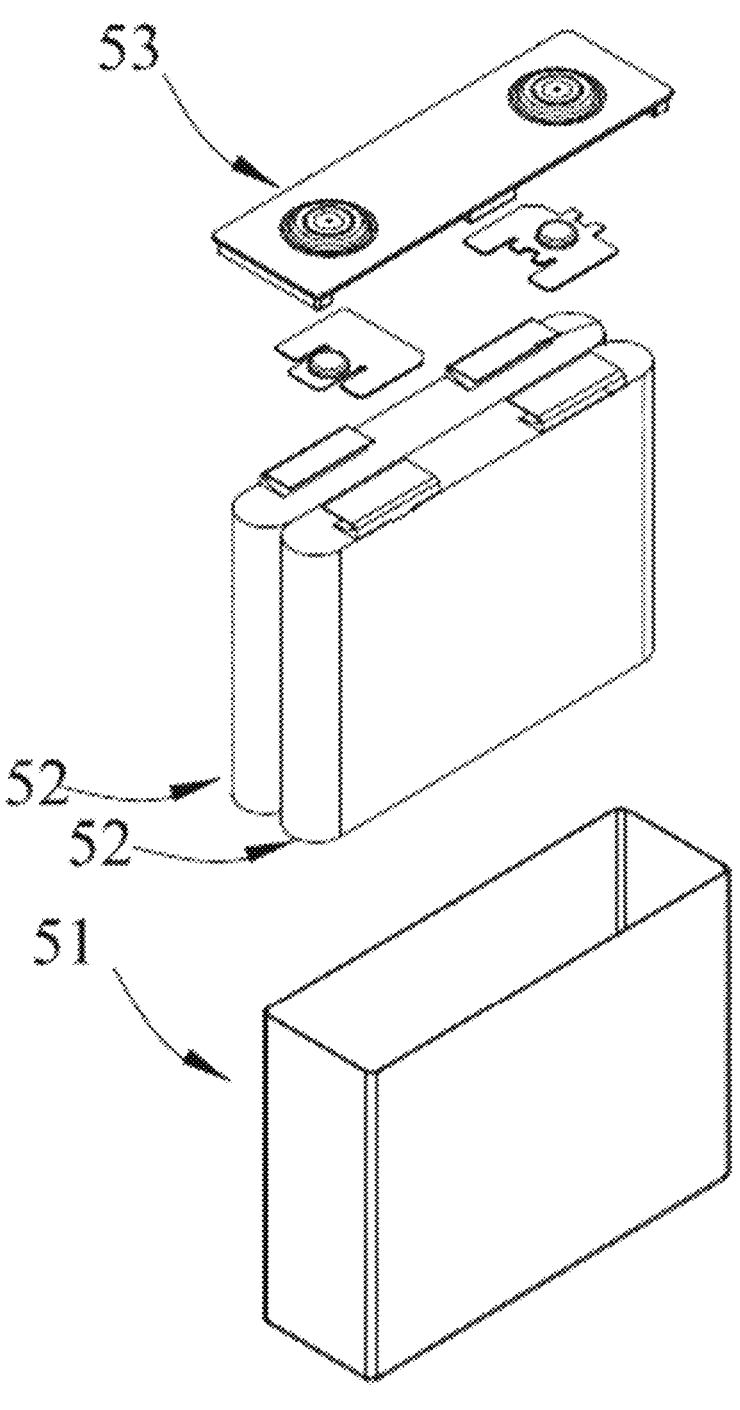
FIG. 6 is an exploded view of FIG. 5.

In some embodiments, referring to FIG. 6, the outer package may include a housing 51 and a cover plate 53. The housing 51 may include a base plate and a side plate connected to the base plate, and the base plate and the side plate enclose an accommodating cavity. The housing 51 has an opening in communication with the accommodating cavity, and the cover plate 53 can cover the opening to close the accommodating cavity.

The positive electrode plate, the negative electrode plate, and a separator form an electrode assembly 52 through winding or lamination. The electrode assembly 52 is packaged in the accommodating cavity. The electrolyte may be a liquid electrolyte, and the liquid electrolyte infiltrates the electrode assembly 52. There may be one or more electrode assemblies 52 in the secondary battery 5, and the quantity may be adjusted as required.

In some embodiments, the outer package of the secondary battery may be a hard shell, for example, a hard plastic shell, an aluminum shell, or a steel shell. The outer package of the secondary battery may alternatively be soft pack, for example, a soft pouch. A material of the soft pack may be plastic, for example, may include one or more of polypropylene (PP), polybutylene terephthalate (PBT), polybutylene succinate (PBS), and the like.

In some embodiments, the secondary battery may be assembled into a battery module. The battery module may include a plurality of secondary batteries and a specific quantity may be adjusted based on application and capacity of the battery module.

Figure 7:
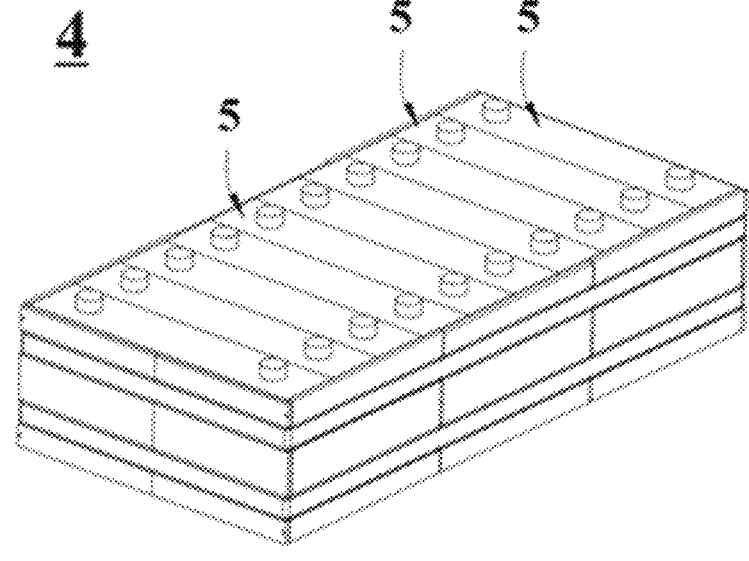
FIG. 7 is a schematic diagram of an embodiment of a battery module.

FIG. 7 shows a battery module 4 as an example. Referring to FIG. 7, in the battery module 4, a plurality of secondary batteries 5 may be sequentially arranged along a length direction of the battery module 4. Certainly, the secondary batteries may alternatively be arranged in any other manner. Further, the plurality of secondary batteries 5 may be fastened through fasteners.

In some embodiments, the battery module 4 may further include a housing with an accommodating space, and the plurality of secondary batteries 5 are accommodated in the accommodating space.

In some embodiments, the battery module may be further assembled into a battery pack, and a quantity of battery modules included in the battery pack may be adjusted based on application and capacity of the battery pack.

Figure 8:
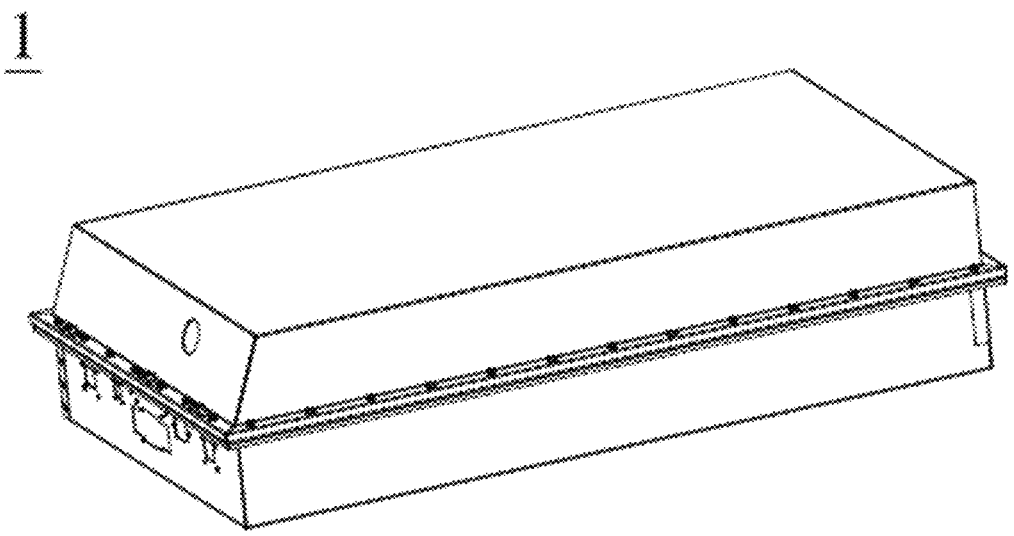
FIG. 8 is a schematic diagram of an embodiment of a battery pack.
Figure 9:
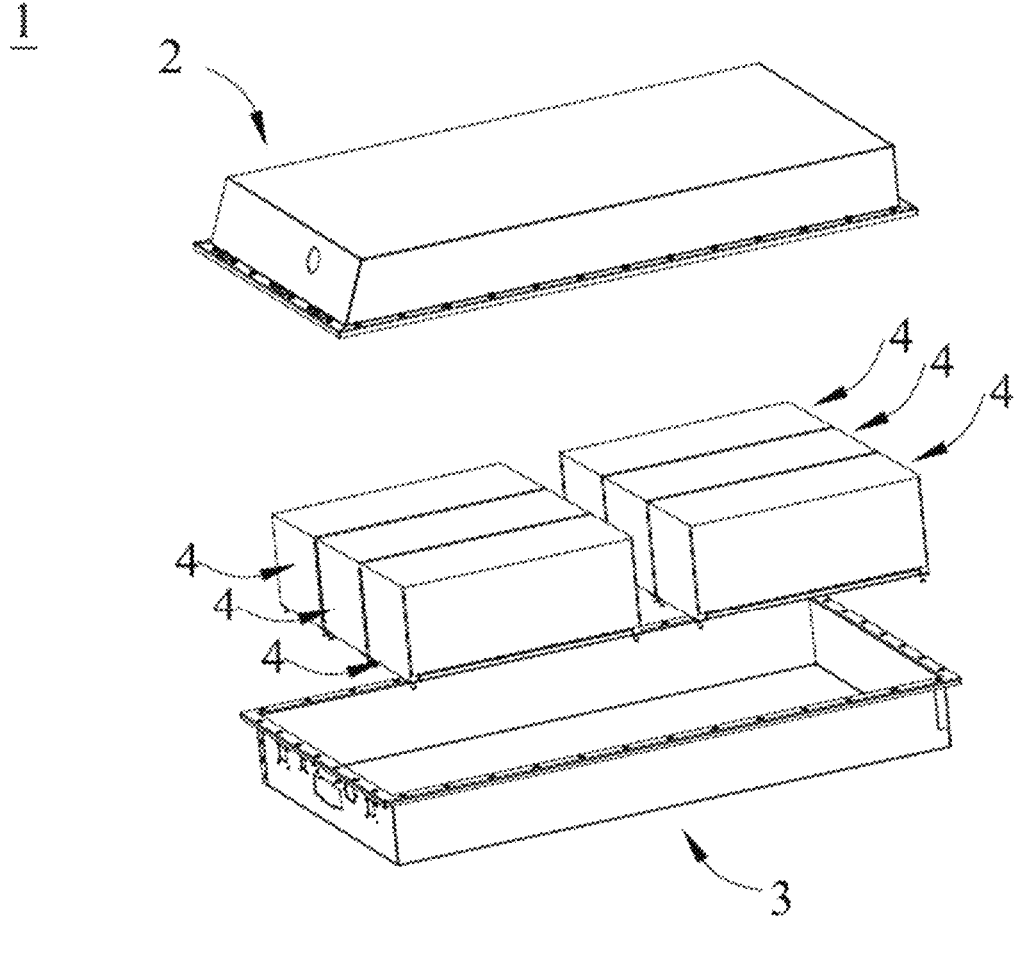
FIG. 9 is an exploded view of FIG. 8.

FIG. 8 and FIG. 9 show a battery pack 1 as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

Apparatus

This application further provides an apparatus, and the apparatus includes at least one of the secondary battery, the battery module, or the battery pack. The secondary battery, the battery module, or the battery pack may be used as a power source of the apparatus or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The secondary battery, the battery module, or the battery pack may be selected for the apparatus based on requirements for using the apparatus.

Figure 10:
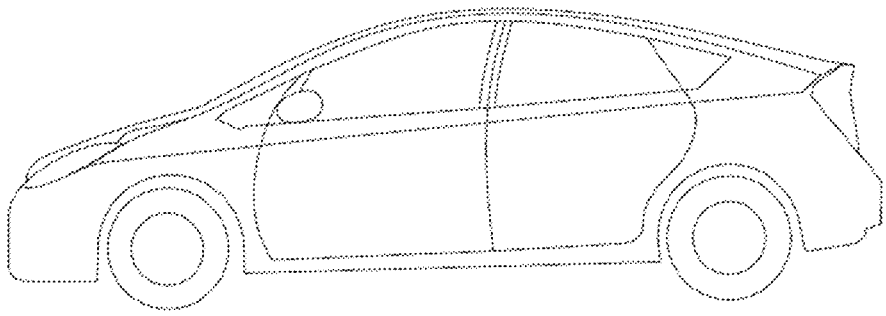
FIG. 10 is a schematic diagram of an embodiment of an apparatus that uses a secondary battery as a power source.

FIG. 10 shows an apparatus as an example. The apparatus is a battery electric vehicle, a hybrid electric vehicle, a plug-in hybrid electric vehicle, or the like. To meet a requirement of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power source.

The following further describes beneficial effects of this application with reference to examples.

EXAMPLES

To make the technical problems, technical solutions, and beneficial effects of this application clearer, the following further describes this application in detail with reference to the examples and the accompanying drawings. Apparently, the described examples are merely some but not all of the examples of this application. The following description of at least one illustrative example is merely illustrative and definitely is not construed as any limitation on this application or on use of this application. All other examples obtained by persons of ordinary skill in the art based on the examples of this application without creative efforts shall fall within the protection scope of this application.

The materials used in the examples are all commercially available. For example, the substrate may be purchased from Shanghai Energy New Materials Technology Co., Ltd., the inorganic particle may be purchased from Estone Material Technology Co., Ltd., the first organic particle may be purchased from Arkema (Changshu) Chemicals Co., Ltd., the second organic particle may be purchased from Sichuan Indigo Technology Co., Ltd., the heat-resistant adhesive may be purchased from Sichuan Indigo Technology Co., Ltd., the wetting agent may be purchased from Dow Chemical Company, and the dispersant may be purchased from Changshu Wealthy Science and Technology Co., Ltd.

I. Preparation of Separator

Separator 1:

(1) A polyethylene (PE) substrate was provided. For example, the substrate had thickness of 7 μm and porosity of 36%.

(2) A coating layer slurry was prepared: inorganic particles aluminum oxide ($Al_2O_3$), first organic particles vinylidene fluoride-hexafluoropropylene copolymer, a heat-resistant adhesive acrylic acid-acrylonitrile copolymer, a dispersant sodium carboxymethyl cellulose (CMC-Na), and a wetting agent silicone modified polyether were uniformly mixed in an appropriate amount of a solvent deionized water at a dry weight ratio of 73:20:5:1.5:0.5 to obtain a coating layer slurry with a solid content of 35% (by weight). A volume-based median particle size $D_v50$ of the inorganic particles aluminum oxide ($Al_2O_3$) was 1 μm, and a number-based median particle size of the first organic particles was 12 μm.

(3) The coating layer slurry prepared in step (2) was applied on two surfaces of the polyethylene (PE) substrate by using a coater, followed by processes such as drying and slitting, to obtain a separator 1. The number of lines of a gravure roller of the coater was 190 LPI, a speed of the coating was 70 m/min, a linear speed ratio of the coating was 1.3, and coating weight per unit area on a single surface of the separator was 2.0 $g/m^2$. In the separator, the first organic particles were embedded into an inorganic particle layer and formed bulges on a surface of the inorganic particle layer.

The preparation methods of the separators 2 to 17 and the comparative separators 1 and 2 were similar to that of the separator 1 except that the number-based median particle size, mass percentage, and substance type of the first organic particles were adjusted. Refer to Table 1 for details.

The preparation methods of the separators 18 to 32 were similar to that of the separator 1 except that the second organic particles were added into the coating layer, and the number-based median particle size, mass percentage, and substance type of the second organic particles were adjusted. Refer to Table 1 for details.

II. Preparation of Battery

Example 1

1. Preparation of Positive Electrode Plate

A positive electrode active material $LiNi_{0.5}Co_{0.2}Mn_{0.3}O_2$ (NCM523), a conductive agent carbon black (Super P), and a binder polyvinylidene fluoride (PVDF) were uniformly mixed in an appropriate amount of a solvent N-methylpyrrolidone (NMP) at a mass ratio of 96.2:2.7:1.1 to obtain a positive electrode slurry. The positive electrode slurry was applied on a positive electrode current collector aluminum foil, followed by processes such as drying, cold pressing, slitting, and cutting, to obtain a positive electrode plate.

2. Preparation of Negative Electrode Plate

A negative electrode active material artificial graphite, a conductive agent carbon black (Super P), a binder styrene-butadiene rubber (SBR) and sodium carboxymethyl cellulose (CMC-Na) were uniformly mixed in an appropriate amount of a solvent deionized water at a mass ratio of 96.4:0.7:1.8:1.1 to obtain a negative electrode slurry. The negative electrode slurry was applied on a negative electrode current collector copper foil, followed by processes such as drying, cold pressing, slitting, and cutting, to obtain a negative electrode plate.

3. Separator

The separator was the separator 1 prepared by using the foregoing method.

4. Preparation of Electrolyte

Ethylene carbonate (EC) and ethyl methyl carbonate (EMC) were mixed at a mass ratio of 30:70 to obtain an organic solvent. A fully dried electrolytic salt $LiPF_6$, with a concentration of 1.0 mol/L, was dissolved in the mixed solvent, and then was uniformly mixed with the solvent to obtain an electrolyte.

5. Preparation of Secondary Battery

The positive electrode plate, the separator, and the negative electrode plate were sequentially stacked, so that the separator was located between the positive electrode plate and the negative electrode plate to provide separation, and then were wound to obtain an electrode assembly. The electrode assembly was placed in an outer package and the prepared electrolyte was injected into the dried secondary battery, followed by processes such as vacuum packaging, standing, formation, and shaping, to obtain a secondary battery.

The preparation methods of the secondary batteries in Examples 2 to 32 and Comparative Examples 1 and 2 were similar to that in Example 1, only different in separators that were used. Refer to Table 1 and Table 2 for details.

III. Performance Test of Battery

1. Cycling Capacity Retention Rate

At 25° C., the secondary batteries prepared in the examples and comparative examples were charged to a charge cut-off voltage of 4.2 V at a constant current of 1C, then charged to a current ≤0.05 C at a constant voltage, left standing for 30 min, then discharged to a discharge cut-off voltage of 2.8 V at a constant current of 0.33 C, and left standing for 30 min. A battery capacity at that time was recorded as C0. The batteries were subject to 1500 charge and discharge cycles by using the method, and a battery capacity after 1500 cycles was recorded as C1.

A cycling capacity retention rate of a battery at 25° C.=C1/C0×100%.

2. Performance Test of Crack SOH (State of Health)

At 25° C., the secondary batteries prepared in the examples and comparative examples were charged to a charge cut-off voltage of 4.25 V at a constant current of 0.5 C, then charged to a current ≤0.05 C at a constant voltage, left standing for 30 min, then discharged to a discharge cut-off voltage of 2.8 V at a constant current of 0.33 C, and left standing for 30 min. A battery capacity at that time was recorded as C0.

The batteries were subject to charge and discharge cycle test by using the method. Each time the battery capacity declined by 1% based on C0, an X-ray CT test (X-ray computed tomography) was performed on the batteries. When breakage at corner of the positive electrode plate or the negative electrode plate of the battery was observed, a battery capacity at that time was recorded as C1.

Crack SOH=C1/C0×100%

3. Heat Spreading Performance

At 25° C., the secondary batteries prepared in the examples and comparative examples were charged to a charge cut-off voltage of 4.2 V at a constant current of 1 C, then charged to a current ≤0.05 C at a constant voltage, and left standing for 10 min. Then a metal heating plate was attached to a surface of the battery, the battery was fixed with a damper at a position of the battery not in contact with the heating plate, a heat insulation pad of 3 mm was added between the damper and the battery, and the battery was heated at a constant temperature of 200° C. until thermal runaway occurs. A time of the thermal runaway of the battery was recorded.

Table 1 and Table 2 list the battery performance obtained through measurement in the examples and comparative examples.

TABLE 1

| No. | | | | Separator | | Battery performance | | |
|---|---|---|---|---|---|---|---|---|
| | | First organic particle | | | Mass ratio of constituents in coating layer Inorganic particle:first organic particle:heat- | | | |
| | | | | Number-based median particle size (μm) | resistant adhesive: dispersant: wetting agent | Cycling capacity retention rate | Crack SOH | Heat spreading time (second) |
| | | Type | Morphology | | | | | |
| Example 1 | Separator 1 | Vinylidene fluoride-hexafluoro-propylene copolymer | Secondary particle | 12 | 73:20:5:1.5:0.5 | 89.0 | 74.8 | 501 |
| Example 2 | Separator 2 | Vinylidene fluoride-hexafluoro-propylene copolymer | Secondary particle | 15 | 73:20:5:1.5:0.5 | 90.5 | 73.7 | 535 |
| Example 3 | Separator 3 | Vinylidene fluoride-hexafluoro-propylene copolymer | Secondary particle | 17 | 73:20:5:1.5:0.5 | 90.4 | 74.2 | 542 |
| Example 4 | Separator 4 | Vinylidene fluoride-hexafluoro-propylene copolymer | Secondary particle | 20 | 73:20:5:1.5:0.5 | 89.1 | 74.4 | 515 |
| Example 5 | Separator 5 | Vinylidene fluoride-hexafluoro-propylene copolymer | Secondary particle | 22 | 73:20:5:1.5:0.5 | 88.1 | 74.6 | 520 |
| Example 6 | Separator 6 | Vinylidene fluoride-hexafluoro-propylene copolymer | Secondary particle | 25 | 73:20:5:1.5:0.5 | 87.0 | 74.9 | 522 |
| Example 7 | Separator 7 | Vinylidene fluoride-hexafluoro-propylene copolymer | Secondary particle | 28 | 73:20:5:1.5:0.5 | 86.5 | 75.5 | 518 |
| Example 8 | Separator 8 | Vinylidene fluoride-hexafluoro-propylene copolymer | Secondary particle | 30 | 73:20:5:1.5:0.5 | 85.2 | 76.2 | 520 |
| Example 9 | Separator 9 | Vinylidene fluoride-hexafluoro-propylene copolymer | Secondary particle | 32 | 73:20:5:1.5:0.5 | 83.1 | 76.6 | 524 |
| Example 10 | Separator 10 | Vinylidene fluoride-hexafluoro-propylene copolymer | Secondary particle | 35 | 73:20:5:1.5:0.5 | 82.1 | 76.9 | 518 |
| Example 11 | Separator 11 | Vinylidene fluoride-hexafluoro-propylene copolymer | Secondary particle | 15 | 83:10:5:1.5:0.5 | 79.1 | 76.3 | 545 |
| Example 12 | Separator 12 | Vinylidene fluoride-hexafluoro-propylene copolymer | Secondary particle | 15 | 81:12:5:1.5:0.5 | 78.9 | 76.1 | 540 |

TABLE 1-continued

| No. | | | First organic particle | | Mass ratio of constituents in coating layer Inorganic particle:first organic particle:heat-resistant adhesive:dispersant:wetting agent | Battery performance | | |
|---|---|---|---|---|---|---|---|---|
| | | Type | Morphology | Number-based median particle size (μm) | | Cycling capacity retention rate | Crack SOH | Heat spreading time (second) |
| Example 13 | Separator 13 | Vinylidene fluoride-hexafluoro-propylene copolymer | Secondary particle | 15 | 78:15:5:1.5:0.5 | 79.2 | 75.9 | 538 |
| Example 14 | Separator 14 | Vinylidene fluoride-hexafluoro-propylene copolymer | Secondary particle | 15 | 68:25:5:1.5:0.5 | 86.5 | 74.2 | 510 |
| Example 15 | Separator 15 | Vinylidene fluoride-hexafluoro-propylene copolymer | Secondary particle | 15 | 63:30:5:1.5:0.5 | 85.5 | 74.9 | 508 |
| Example 16 | Separator 16 | Polyethylene | Secondary particle | 15 | 73:20:5:1.5:0.5 | 83.2 | 73.9 | 520 |
| Example 17 | Separator 17 | Vinylidene fluoride-hexafluoro-propylene-acrylic acid copolymer | Secondary particle | 15 | 73:20:5:1.5:0.5 | 84.1 | 74.1 | 521 |
| Comparative Example 1 | Comparative separator 1 | Vinylidene fluoride-hexafluoro-propylene copolymer | Secondary particle | 10 | 73:20:5:1.5:0.5 | 76.5 | 76.2 | 458 |
| Comparative Example 2 | Comparative separator 2 | Vinylidene fluoride-hexafluoro-propylene copolymer | Secondary particle | 5 | 73:20:5:1.5:0.5 | 76.4 | 76.3 | 448 |

TABLE 2

| No. | | First organic particle | | | Second organic particle | |
|---|---|---|---|---|---|---|
| | | Type | Morphology | Number-based median | Type | Morphology |
| Example 18 | Separator 18 | Vinylidene fluoride-hexafluoro-propylene copolymer | Secondary particle | 15 | Butyl methacrylate-isooctyl acrylate-styrene copolymer | Primary particle |
| Example 19 | Separator 19 | Vinylidene fluoride-hexafluoro-propylene copolymer | Secondary particle | 15 | Butyl methacrylate-isooctyl acrylate-styrene copolymer | Primary particle |

TABLE 2-continued

| | | | | | | | |
|---|---|---|---|---|---|---|---|
| Example 20 | Separator 20 | Vinylidene fluoride-hexafluoro-propylene copolymer | Secondary particle | 15 | Butyl methacrylate-isooctyl acrylate-styrene copolymer | Primary particle | |
| Example 21 | Separator 21 | Vinylidene fluoride-hexafluoro-propylene copolymer | Secondary particle | 15 | Butyl methacrylate-isooctyl acrylate-styrene copolymer | Primary particle | |
| Example 22 | Separator 22 | Vinylidene fluoride-hexafluoro-propylene copolymer | Secondary particle | 15 | Butyl methacrylate-isooctyl acrylate-styrene copolymer | Primary particle | |
| Example 23 | Separator 23 | Vinylidene fluoride-hexafluoro-propylene copolymer | Secondary particle | 15 | Butyl methacrylate-isooctyl acrylate-styrene copolymer | Primary particle | |
| Example 24 | Separator 24 | Vinylidene fluoride-hexafluoro-propylene copolymer | Secondary particle | 15 | Butyl methacrylate-isooctyl acrylate-styrene copolymer | Primary particle | |
| Example 25 | Separator 25 | Vinylidene fluoride-hexafluoro-propylene copolymer | Secondary particle | 15 | Butyl methacrylate-isooctyl acrylate-styrene copolymer | Primary particle | |
| Example 26 | Separator 26 | Vinylidene fluoride-hexafluoro-propylene copolymer | Secondary particle | 15 | Butyl methacrylate-isooctyl acrylate-styrene copolymer | Primary particle | |
| Example 27 | Separator 27 | Vinylidene fluoride-hexafluoro-propylene copolymer | Secondary particle | 15 | Butyl methacrylate-isooctyl acrylate-styrene copolymer | Primary particle | |
| Example 28 | Separator 28 | Vinylidene fluoride-hexafluoro-propylene copolymer | Secondary particle | 15 | Butyl methacrylate-isooctyl acrylate-styrene copolymer | Primary particle | |
| Example 29 | Separator 29 | Vinylidene fluoride-hexafluoro-propylene copolymer | Secondary particle | 15 | Butyl methacrylate-isooctyl acrylate-styrene copolymer | Primary particle | |
| Example 30 | Separator 30 | Vinylidene fluoride-hexafluoro-propylene copolymer | Secondary particle | 15 | Butyl methacrylate-isooctyl acrylate-styrene copolymer | Primary particle | |
| Example 31 | Separator 31 | Vinylidene fluoride-hexafluoro-propylene copolymer | Secondary particle | 15 | Styrene-vinyl acetate-copolymer | Primary particle | |
| Example 32 | Separator 32 | Vinylidene fluoride-hexafluoro-propylene copolymer | Secondary particle | 15 | Styrene-vinyl acetate-pyrrolidone copolymer | Primary particle | |

TABLE 2-continued

| | Separator | | | | |
| | | Mass ratio of constituents in coating layer | Battery performance | | |
| No. | Second organic particle Number-based median | Inorganic particle: first organic particle: heat-resistant adhesive: dispersant:wetting agent | Cycling capacity retention rate | Crack SOH | Heat spreading time (second) |
|---|---|---|---|---|---|
| Example 18 | 1 | 72:15:6:5:1.5:0.5 | 89.3 | 74.1 | 508 |
| Example 19 | 2 | 72:15:6:5:1.5:0.5 | 89.5 | 74.1 | 515 |
| Example 20 | 2.5 | 72:15:6:5:1.5:0.5 | 90.2 | 74.0 | 525 |
| Example 21 | 3 | 72:15:6:5:1.5:0.5 | 90.1 | 73.9 | 540 |
| Example 22 | 4 | 72:15:6:5:1.5:0.5 | 90.2 | 73.9 | 570 |
| Example 23 | 5 | 72:15:6:5:1.5:0.5 | 90.1 | 74.1 | 565 |
| Example 24 | 6 | 72:15:6:5:1.5:0.5 | 90.0 | 74.1 | 545 |
| Example 25 | 7 | 72:15:6:5:1.5:0.5 | 89.9 | 74.3 | 530 |
| Example 26 | 4 | 76:15:2:5:1.5:0.5 | 89.8 | 74.4 | 510 |
| Example 27 | 4 | 74:15:4:5:1.5:0.5 | 89.6 | 74.7 | 570 |
| Example 28 | 4 | 70:15:8:5:1.5:0.5 | 89.5 | 74.8 | 520 |
| Example 29 | 4 | 68:15:10:5:1.5:0.5 | 89.7 | 74.9 | 515 |
| Example 30 | 4 | 66:15:12:5:1.5:0.5 | 89.2 | 74.8 | 508 |
| Example 31 | 4 | 72:15:6:5:1.5:0.5 | 88.5 | 74.5 | 555 |
| Example 32 | 4 | 72:15:6:5:1.5:0.5 | 87.5 | 74.5 | 545 |

As can be seen from Table 1, using the first organic particles with a specific structure and a number-based median particle size falling within the defined range in this application can significantly improve cycling performance and safety performance of a battery. Particularly, further optimizing the number-based median particle size, mass percentage in the coating layer, or substance type of the first organic particles can further improve the cycling performance and safety performance of the battery. By contrast, Comparative Examples 1 and 2 do not meet requirements of this application, and therefore the battery cannot have both good cycling performance and safety performance.

As can be seen from Table 2, further adding the second organic particles of a specific quantity and a specific type within a specific range of number-based median particle size can further improve the cycling performance and safety performance of the battery.

The inventors also used other quantities and materials of the inorganic particles, the first organic particles, and the second organic particles within the range of this application, other substrates, other coating process parameters, and other process conditions for the test, and obtained an improving effect similar to that in Examples 1 to 32 in terms of the cycling performance and safety performance of the battery.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A separator, comprising:
a substrate; and
a coating layer provided on at least one surface of the substrate;
wherein the coating layer comprises:
an inorganic particle layer disposed on the substrate and comprising inorganic particles; and
organic particles,
wherein the organic particles comprise first organic particles, and the first organic particles are secondary particles formed by agglomerating primary particles with a particle size of 150 nm-300 nm, the first organic particles are partially embedded into the inorganic particle layer and form bulges on a surface of the inorganic particle layer,
the first organic particles comprise one selected from the group consisting of polytetrafluoroethylene, polychlorctrifluoroethylene, polyvinyl fluoride, polyvinylidene fluoride, polyethylene, polypropylene, polyacrylonitrile, polyethylene oxide, a copolymer containing different fluoroalkenyl monomer units, a copolymer containing fluoroalkenyl monomer units and alkenyl monomer units, a copolymer containing fluoroalkenyl monomer units and acrylic acid monomer units, a copolymer containing fluoroalkenyl monomer units and acrylate monomer units, and any combinations thereof;
a mass percentage of the first organic particles in the coating layer is 15% to 25%;
a mass percentage of the inorganic particles in the coating layer is 65%-75%; and
a number-based median particle size of the first organic particles is from 12 μm to 25 μm,
wherein the organic particles further comprise second organic particles, the second organic particles are embedded into the inorganic particle layer and form bulges on a surface of the inorganic particle layer, and the second organic particles are primary particles, a number-based median particle size of the second organic particles is 2 μm to 10 μm, and a mass percentage of the second organic particles in the coating layer is 2% to 10%;
wherein the second organic particles comprise a copolymer of an acrylate monomer unit and a styrene monomer unit, the acrylate monomeric unit comprising at least one of an isooctyl acrylate unit or an isooctyl methacrylate unit,
a mass percentage of the second organic particles in the coating is less than a mass percentage of the first organic particles in the coating.

2. The separator according to claim 1, wherein the number-based median particle size of the first organic particles is 15 μm-20 μm.

3. The separator according to claim 1, wherein the first organic particle comprises one or more of polytetrafluoroethylene, polychlorctrifluoroethylene, polyethylene, polypropylene, polyacrylonitrile, polyethylene oxide.

4. The separator according to claim 1, wherein the first organic particle comprises one or more of vinylidene fluoride-trifluoroethylene-hexafluoropropylene copolymer, vinylidene fluoride-hexafluoropropylene-acrylic acid copolymer, vinylidene fluoride-hexafluoropropylene-acrylate copolymer.

5. The separator according to claim 1, wherein the mass percentage of the first organic particles in the coating layer is 20%-25%.

6. A separator comprising:

a substrate; and a coating layer provided on at least one surface of the substrate;

wherein the coating layer comprises:

an inorganic particle layer disposed on the substrate and comprising inorganic particles, wherein a mass percentage of the inorganic particles in the coating layer is ≤85%; and organic particles, wherein the organic particles comprise first organic particles, the first organic particles are secondary particles partially embedded into the inorganic particle layer and form bulges on a surface of the inorganic particle layer, a mass percentage of the first organic particles in the coating layer is 15% to 25%, a number-based median particle size of the first organic particles is from 12 μm to 25 μm;

wherein the organic particles further comprise second organic particles, the second organic particles are embedded into the inorganic particle layer and form bulges on a surface of the inorganic particle layer, and the second organic particles are primary particles, a number-based median particle size of the second organic particles is 2 μm to 10 μm, and a mass percentage of the second organic particles in the coating layer is 2% to 10%;

wherein the first organic particles comprise one selected from the group consisting of polytetrafluoroethylene, polychlorctrifluoroethylene, polyvinyl fluoride, polyvinylidene fluoride, polyethylene, polypropylene, polyacrylonitrile, polyethylene oxide, a copolymer containing different fluoroalkenyl monomer units, a copolymer containing fluoroalkenyl monomer units and alkenyl monomer units, a copolymer containing fluoroalkenyl monomer units and acrylic acid monomer units, a copolymer containing fluoroalkenyl monomer units and acrylate monomer units, and any combinations thereof, wherein the second organic particles comprise a copolymer of an acrylate monomer unit and a styrene monomer unit, the acrylate monomeric unit comprising at least one of an isooctyl acrylate unit or an isooctyl methacrylate unit, a mass percentage of the second organic particles in the coating is less than a mass percentage of the first organic particles in the coating.

7. The separator according to claim 6, wherein a number-based median particle size of the second organic particles is 2.5 to 6 μm.

8. The separator according to claim 6, wherein the mass percentage of the second organic particles in the coating layer is 2%-8%.

9. The separator according to claim 1, wherein a volume-based median particle size Dv50 of the inorganic particles is 0.5 μm-2.5 μm.

10. The separator according to claim 1, wherein the inorganic particle comprises one or more of boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

11. The separator according to claim 1, wherein the separator satisfies:

(1) an air permeability of the separator is 100 s/100 mL-300 s/100 mL;

(2) a tensile strength in transverse direction (MD) of the separator is 1500 $kgf/cm^2$-3000 $kgf/cm^2$;

(3) a tensile strength in machine direction (TD) of the separator is 1000 $kgf/cm^2$-2500 $kgf/cm^2$;

(4) a transverse elongation at break of the separator is 50%-200%; and (5) a longitudinal elongation at break of the separator is 50%-200%.

12. The separator according to claim 1, wherein the inorganic particles and the organic particles form uneven pore structures in the coating layer.

13. The separator according to claim 1, wherein a distance between any two adjacent inorganic particles is denoted as L1, a distance between any adjacent inorganic particle and organic particle is denoted as L2, and L1<L2.

14. A method for preparing the separator according to claim 1, comprising the following steps:

(1) providing a substrate;

(2) providing a coating layer slurry, wherein the coating layer slurry comprises constituent materials and a solvent, the constituent materials comprise inorganic particles and organic particles, and the organic particles comprise first organic particles; and (3) applying the coating layer slurry in step (2) on at least one side of the substrate in step (1) to form a coating layer, and performing drying to obtain the separator;

wherein the separator comprises: the substrate; and the coating layer provided on at least one surface of the substrate, wherein the coating layer comprises the inorganic particles and the organic particles, the organic particles comprise the first organic particles, the first organic particles are embedded into the inorganic particles and form bulges on a surface of the coating layer, and a number-based median particle size of the first organic particles is ≥12 μm.

15. The method according to claim 14, wherein in step (2), the organic particles further comprise second organic particles, and the second organic particles are primary particles.

16. The method according to claim 15, wherein mass of the added second organic particles is less than or equal to mass of the added first organic particles; and a percentage of the mass of the added second organic particles in a total dry weight of the constituent materials is below 10%.

17. The method according to claim 14, wherein the method satisfies one or more of the following conditions (1) to (7):

(1) in step (2), a percentage of the mass of the added first organic particles in the total dry weight of the constituent materials is above 12%;

(2) in step (2), a solid content of the coating layer slurry is 28%-45%;

(3) in step (3), a coater is used for the coating, the coater comprises a gravure roller, and the number of lines of the gravure roller is 100 LPI-300 LPI;

(4) in step (3), a speed of the coating is 30 m/min-90 m/min;

(5) in step (3), a linear speed ratio of the coating is 0.8-2.5;

(6) in step (3), a drying temperature is 40° C.-70° C.; and (7) in step (3), drying time is 10s-120s.

18. A secondary battery, comprising the separator according to claim 1.

19. A battery module, comprising the secondary battery according to claim 18.

20. A battery pack, comprising the battery module according to claim 19.

21. The separator according to claim 6, wherein the second organic particles comprise one or more selected from the group consisting of, butyl methacrylate-isooctyl methacrylate copolymer, isooctyl methacrylate-styrene copolymer, methyl acrylate-isooctyl methacrylate-styrene copolymer, butyl acrylate-isooctyl acrylate-styrene copolymer, butyl acrylate-isooctyl methacrylate-styrene copolymer, butyl methacrylate-isooctyl acrylate-styrene copolymer, butyl methacrylate-isooctyl methacrylate-styrene copolymer, isooctyl methacrylate-styrene-acrylonitrile copolymer, and any combinations thereof.

22. The separator according to claim 6, wherein the first organic particle comprises one or more of polychlorctrifluoreethylene, polyethylene, polypropylene, polyacrylonitrile, polyethylene oxide, vinylidene fluoride-trifluoroethylene-hexafluoropropylene copolymer, vinylidene fluoride-hexafluoropropylene-acrylic acid copolymer, vinylidene fluoride-hexafluoropropylene-acrylate copolymer.

* * * * *